US009340732B2

(12) United States Patent
Steve

(10) Patent No.: US 9,340,732 B2
(45) Date of Patent: *May 17, 2016

(54) REFINERY PROCESS FOR HEAVY OIL AND BITUMEN

(71) Applicant: Expander Energy Inc., Calgary (CA)

(72) Inventor: Kresnyak Steve, Calgary (CA)

(73) Assignee: Expander Energy Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,876

(22) Filed: Feb. 6, 2014

(65) Prior Publication Data

US 2014/0350131 A1    Nov. 27, 2014

(30) Foreign Application Priority Data

May 24, 2013  (CA) ..................................... 2818322

(51) Int. Cl.
  *C10G 2/00*  (2006.01)
  *C01B 3/36*  (2006.01)
  *C01B 3/38*  (2006.01)

(52) U.S. Cl.
  CPC ... *C10G 2/40* (2013.01); *C01B 3/36* (2013.01); *C01B 3/386* (2013.01); *C10G 2/30* (2013.01);
  (Continued)

(58) Field of Classification Search
  CPC ........... C10G 2400/04; C10G 2400/06; C10G 2400/08; C10G 2/30; C10G 2/32; C10G 2/40; C01B 2203/0233; C01B 2203/0244; C01B 2203/025; C01B 2203/0283; C01B 2203/0405; C01B 2203/0415; C01B 2203/043; C01B 2203/062; C01B 2203/1247; C01B 2203/1258; C01B 3/36; C01B 3/386
  See application file for complete search history.

(56) References Cited

U.S. PATENT DOCUMENTS 2,574,469 A    11/1951  Dressler et al.
3,351,563 A    11/1967  Negra et al.
(Continued)

FOREIGN PATENT DOCUMENTS

CA    2320509    8/1999
CA    2595880    12/2005
(Continued)

OTHER PUBLICATIONS

Daniel B. Gillis and Fred Van Tine, What's New in Solvent Deasphalting? Foster Wheeler International Corporation, Heavy Oils Conference, Jun. 1998, pp. 16-1 to 16-13.
(Continued)

*Primary Examiner* — Jafar Parsa
*Assistant Examiner* — Amy C Bonaparte
(74) *Attorney, Agent, or Firm* — MBM Intellectual Property Law

(57) ABSTRACT

A bitumen and heavy oil upgrading process and system is disclosed for the synthesis of hydrocarbons, an example of which is synthetic crude oil (SCO). The process advantageously avoids the waste attributed to residuum and/or petcoke formation which has a dramatic effect on the yield of hydrocarbon material generated. The process integrates Fischer-Tropsch technology with gasification and hydrogen rich gas stream generation. The hydrogen rich gas generation is conveniently effected using singly or in combination a hydrogen source, a hydrogen rich vapor from hydroprocessing and the Fischer-Tropsch process, a steam methane reformer (SMR) and autothermal reformer (ATR) or a combination of SMR/ATR. The feedstock for upgrading is distilled and the bottoms fraction is gasified and converted in a Fischer-Tropsch reactor. A resultant hydrogen lean syngas is then exposed to the hydrogen rich gas stream to optimize the formation of, for example, the synthetic crude oil.

41 Claims, 8 Drawing Sheets

(52) U.S. Cl.
CPC .............. *C10G 2/32* (2013.01); *C01B 2203/025* (2013.01); *C01B 2203/0233* (2013.01); *C01B 2203/0244* (2013.01); *C01B 2203/0283* (2013.01); *C01B 2203/043* (2013.01); *C01B 2203/0405* (2013.01); *C01B 2203/0415* (2013.01); *C01B 2203/062* (2013.01); *C01B 2203/1247* (2013.01); *C01B 2203/1258* (2013.01); *C10G 2300/1077* (2013.01); *C10G 2400/02* (2013.01); *C10G 2400/04* (2013.01); *C10G 2400/06* (2013.01); *C10G 2400/08* (2013.01)

(56) References Cited

U.S. PATENT DOCUMENTS

| | | | |
|---|---|---|---|
| 3,941,820 | A | 3/1976 | Jackson et al. |
| 4,217,112 | A | 8/1980 | Johanson |
| 4,234,412 | A | 11/1980 | Boersma et al. |
| 4,592,827 | A | 6/1986 | Galiasso et al. |
| 5,378,348 | A | 1/1995 | Davis et al. |
| 5,494,653 | A | 2/1996 | Paisley |
| 6,043,288 | A | 3/2000 | DeGeorge et al. |
| 6,048,449 | A | 4/2000 | Bogdan et al. |
| 6,183,627 | B1 | 2/2001 | Friday et al. |
| 6,241,874 | B1 | 6/2001 | Wallace et al. |
| 6,306,917 | B1 * | 10/2001 | Bohn et al. ............. 518/700 |
| 6,395,944 | B1 | 5/2002 | Griffiths et al. |
| 6,512,018 | B2 | 1/2003 | Kennedy |
| 6,531,516 | B2 | 3/2003 | Davis et al. |
| 6,540,023 | B2 | 4/2003 | Davis et al. |
| RE38,170 | E | 7/2003 | DeGeorge et al. |
| 6,596,780 | B2 | 7/2003 | Jahnke et al. |
| 6,602,404 | B2 | 8/2003 | Walsh et al. |
| 6,656,343 | B2 | 12/2003 | Dancuart |
| 6,693,138 | B2 | 2/2004 | O'Rear |
| 6,696,501 | B2 | 2/2004 | Schanke et al. |
| 6,702,936 | B2 * | 3/2004 | Rettger et al. ............ 208/86 |
| 6,730,285 | B2 | 5/2004 | Aasberg-Petersen et al. |
| 6,765,025 | B2 | 7/2004 | Ding et al. |
| 6,863,802 | B2 | 3/2005 | O'Rear et al. |
| 6,872,753 | B2 * | 3/2005 | Landis et al. ............ 518/705 |
| 6,929,087 | B1 | 8/2005 | Sheppard |
| 6,958,363 | B2 | 10/2005 | Espinoza et al. |
| 7,004,985 | B2 | 2/2006 | Wallace et al. |
| 7,208,530 | B2 | 4/2007 | Norbeck et al. |
| 7,214,720 | B2 | 5/2007 | Bayle et al. |
| 7,381,320 | B2 | 6/2008 | Iqbal et al. |
| 7,407,571 | B2 | 8/2008 | Rettger et al. |
| 7,413,647 | B2 | 8/2008 | Calderon et al. |
| 7,566,394 | B2 | 7/2009 | Koseoglu |
| 7,677,309 | B2 | 3/2010 | Shaw et al. |
| 7,708,877 | B2 | 5/2010 | Farshid et al. |
| 7,749,378 | B2 | 7/2010 | Iqbal et al. |
| 7,776,114 | B2 | 8/2010 | Rüger et al. |
| 7,795,317 | B2 | 9/2010 | Eilers et al. |
| 7,795,318 | B2 | 9/2010 | Van Hardeveld |
| 7,846,979 | B2 | 12/2010 | Rojey et al. |
| 7,855,235 | B2 | 12/2010 | Van Hardeveld |
| 7,863,341 | B2 | 1/2011 | Routier |
| 7,879,919 | B2 | 2/2011 | Ernst et al. |
| 9,156,691 | B2 * | 10/2015 | Kresnyak .............. C01B 21/087 |
| 9,169,443 | B2 * | 10/2015 | Kresnyak ................ C10G 2/30 |
| 2001/0051662 | A1 | 12/2001 | Arcuri et al. |
| 2003/0221992 | A1 | 12/2003 | Gorbaty et al. |
| 2004/0181313 | A1 | 9/2004 | Mohedas et al. |
| 2005/0173305 | A1 | 8/2005 | Smith |
| 2005/0250862 | A1 | 11/2005 | Bayle et al. |
| 2006/0167118 | A1 | 7/2006 | Tijm et al. |
| 2006/0231455 | A1 | 10/2006 | Olsvik et al. |
| 2008/0021119 | A1 | 1/2008 | Norbeck et al. |
| 2008/0021122 | A1 | 1/2008 | Norbeck et al. |
| 2008/0115415 | A1 | 5/2008 | Agrawal et al. |
| 2008/0116111 | A1 | 5/2008 | Newton et al. |
| 2009/0084707 | A1 | 4/2009 | Gil et al. |
| 2009/0200209 | A1 | 8/2009 | Sury et al. |
| 2009/0292571 | A1 | 11/2009 | Gil et al. |
| 2010/0000153 | A1 | 1/2010 | Kurkjian et al. |
| 2010/0036181 | A1 | 2/2010 | Diebold et al. |
| 2010/0113624 | A1 | 5/2010 | Routier et al. |
| 2010/0137458 | A1 | 6/2010 | Erling et al. |
| 2010/0144905 | A1 | 6/2010 | Reaveley et al. |
| 2010/0216898 | A1 | 8/2010 | Tonseth et al. |
| 2011/0009501 | A1 | 1/2011 | Ernst et al. |
| 2011/0049016 | A1 | 3/2011 | McGrady et al. |
| 2012/0270957 | A1 * | 10/2012 | Kresnyak .................. 518/704 |
| 2014/0262937 | A1 * | 9/2014 | Kresnyak .................. 208/14 |
| 2014/0350131 | A1 * | 11/2014 | Steve ........................ 518/703 |
| 2015/0038599 | A1 * | 2/2015 | Kresnyak .................. 518/702 |

FOREIGN PATENT DOCUMENTS

| | | |
|---|---|---|
| CA | 2657656 | 1/2008 |
| CA | 2731376 | 6/2010 |
| CA | 2737872 | 4/2011 |
| CA | 2809503 | 3/2013 |
| CN | 101864324 | 10/2010 |
| EP | 1608924 | 9/2007 |
| RU | 2364616 | 8/2009 |
| WO | 2007009951 | 1/2007 |

OTHER PUBLICATIONS

T.F. Yen, Correlation Between Heavy Crude Sources and Types and Their Refining and Upgrading Methods, No. 1998231, Proceeding of the 7th Unitar International Conference on Heavy Crude and Tar Sands, Beijing, vol. 2, pp. 2137-2144.

Wassim Bedrouni, Bitumen Extraction and Upgrading Coke Gasification with CO2 Capture, 2008, Odec.

Tom Kemp, Prospects for the Future Oils Sands Production (presentation), Jacobs Engineering Canada, Syngas Refiner Oil Sands Workshop, Calgary, Alberta, Canada, Jul. 27, 2006.

Gary, J.H. et al., Petroleum Refining Technology and Economics, 5th ed, CRC Press, 2007, 465 pgs [Office Action cites figure 1.1].

Zinnurovich et al., English abstract corresponding to RU2364616, Aug. 20, 2009.

T.F. Yen, Correlation Between Heavy Crude Sources and Types and Their Refining and Upgrading Methods, No. 1998231, Proceeding of the 7th UNITAR International Conference on Heavy Crude and Tar Sands, Beijing, vol. 2, pp. 2137-2144 (1998).

* cited by examiner

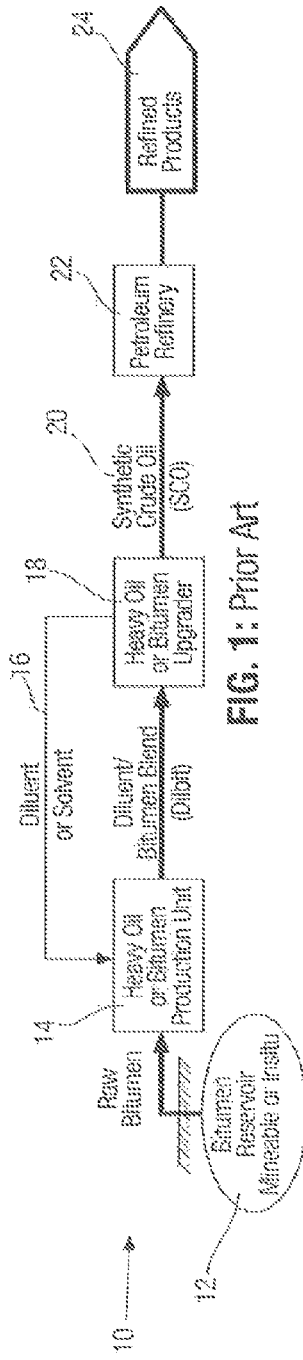
FIG. 1: Prior Art
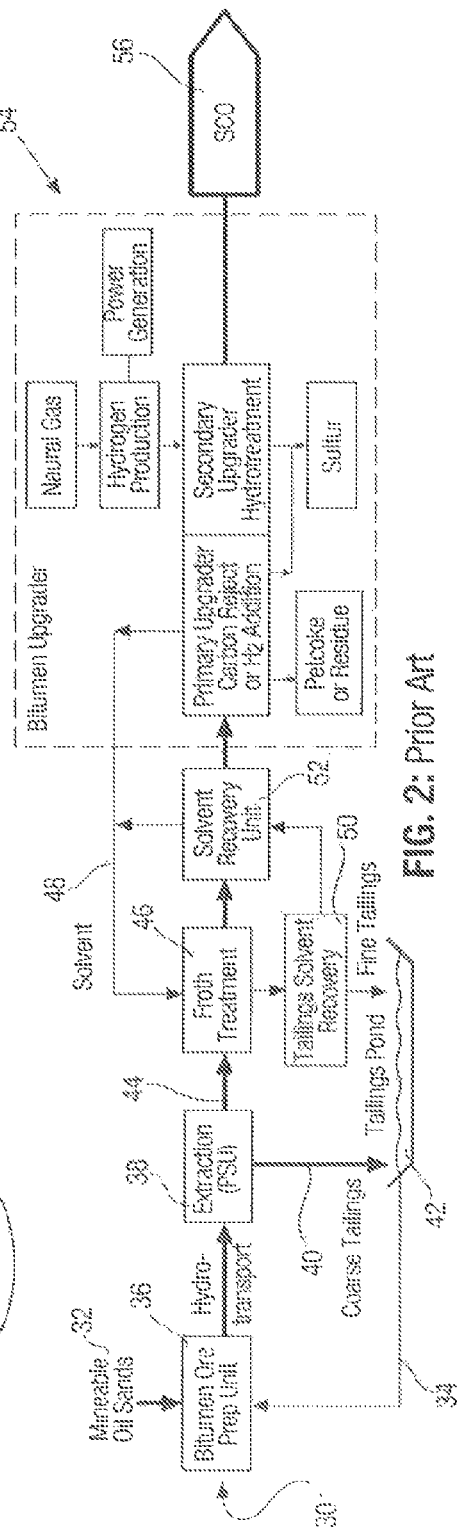
FIG. 2: Prior Art
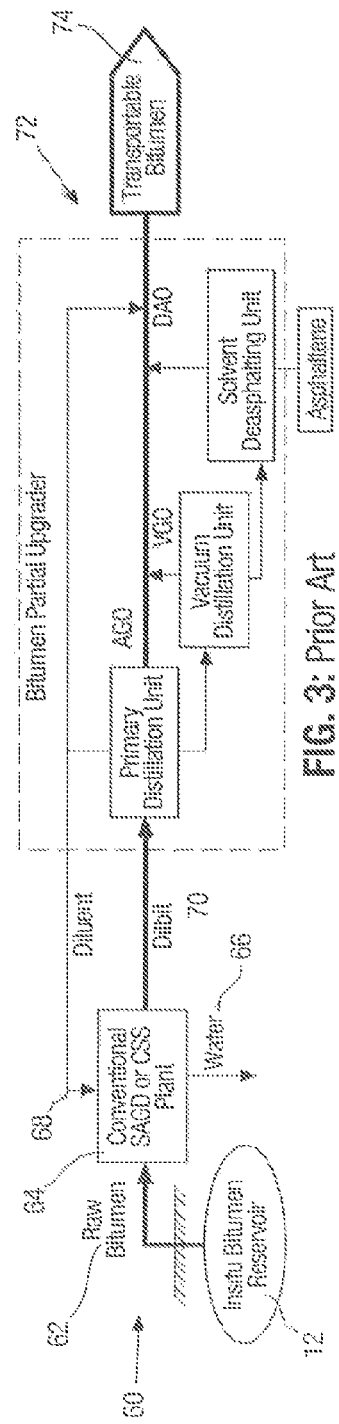
FIG. 3: Prior Art

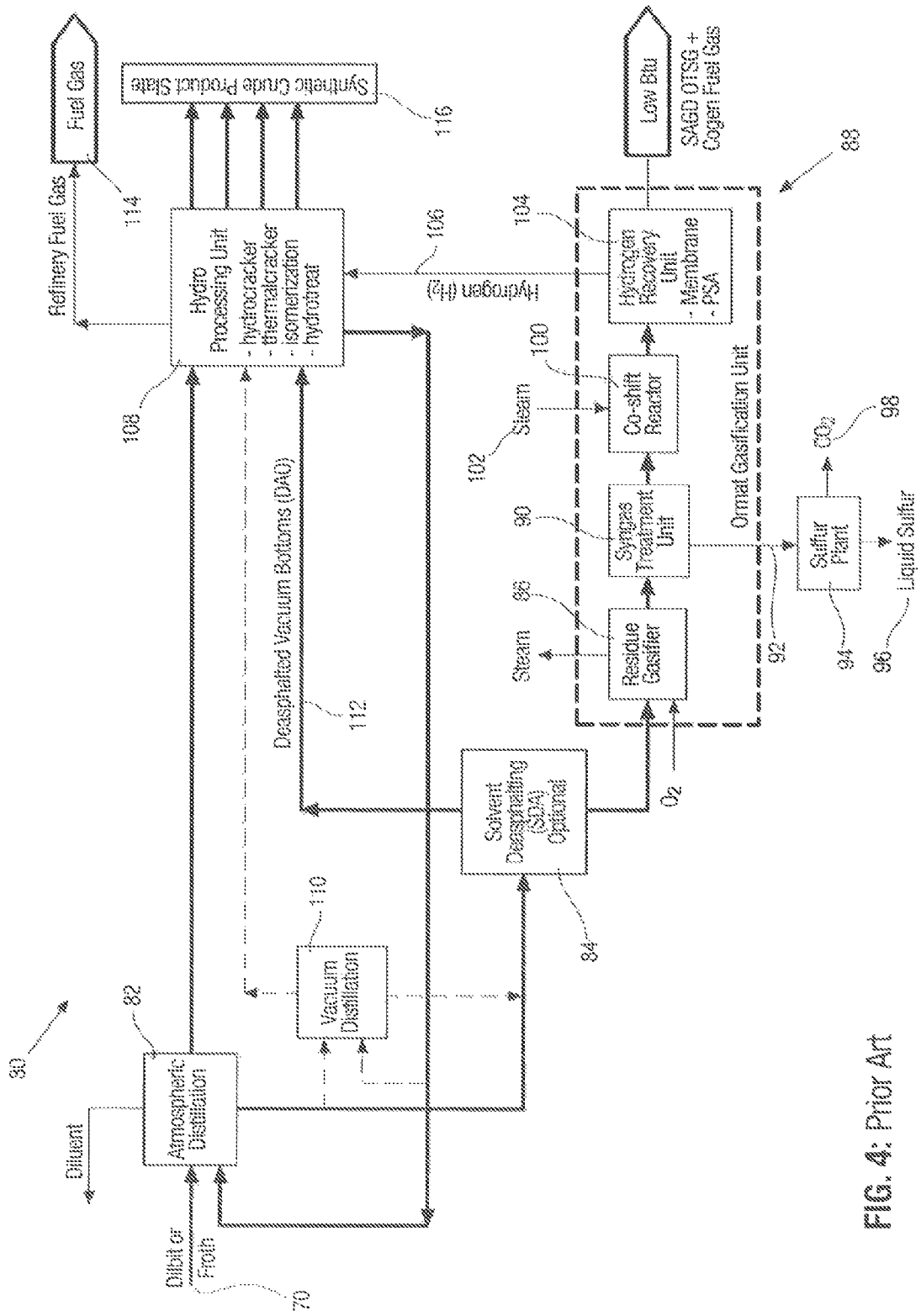
FIG. 4: Prior Art

REFINERY PROCESS FOR HEAVY OIL AND BITUMEN

CROSS-REFERENCE TO RELATED APPLICATIONS

This application claims benefit of priority under 35 U.S.C. §119(e) from Canadian Patent Application No. 2,818,322, filed May 24, 2013. The contents in the aforementioned application are hereby expressly incorporated by reference in its entirety and for all purposes.

FIELD OF THE INVENTION

The present invention relates to modifications of bitumen and heavy oil upgrading processes to synthesize synthetic crude oil and other valuable hydrocarbon byproducts operations in an efficient manner and produce high quality refined fuel products such as naphtha, gasoline, diesel and jet fuel for commercial application.

BACKGROUND OF THE INVENTION

It is well established that certain forms of hydrocarbons require upgrading in order to either transport them or enhance value for sale. Further, conventional refineries are not suited to processing heavy oil, bitumen etc. and thus the viscosity, density and impurity content, such as heavy metals, sulfur and nitrogen, present in such heavy materials must be altered to permit refining. Upgrading is primarily focussed upon reducing viscosity, sulfur, metals, and asphaltene content in the bitumen.

One of the problems with heavy oil and bitumen upgrading is that the asphaltenes and the heavy fraction must be removed or modified to create value and product yield. Typical upgraders exacerbate the problem by the formation of petcoke or residuum which results in undesirable waste material. This material, since it cannot be easily converted by conventional methods, is commonly removed from the process, reducing the overall yield of valuable hydrocarbon material from the upgrading process.

The Fischer-Tropsch process has found significant utility in hydrocarbon synthesis procedures and fuel synthesis. The process has been used for decades to assist in the formulation of hydrocarbons from several materials such as coal, residuum, petcoke, and biomass. In the last several years, the conversion of alternate energy resources has become of great interest, given the escalating environmental concerns regarding pollution, the decline of world conventional hydrocarbon resources, and the increasing concern over tailings pond management, together with the increasing costs to extract, upgrade and refine the heavy hydrocarbon resources. The major producers in the area of synthetic fuels have expanded the art significantly in this technological area with a number of patented advances and pending applications in the form of publications. Applicant's co-pending U.S. application Ser. No. 13/024,925, teaches a fuel synthesis protocol.

Examples of recent advances that have been made in this area of technology includes the features taught in U.S. Pat. No. 6,958,363, issued to Espinoza, et al., Oct. 25, 2005, Bayle et al., in U.S. Pat. No. 7,214,720, issued May 8, 2007, U.S. Pat. No. 6,696,501, issued Feb. 24, 2004, to Schanke et al.

In respect of other progress that has been made in this field of technology, the art is replete with significant advances in, not only gasification of solid carbon feeds, but also methodology for the preparation of syngas, management of hydrogen and carbon monoxide in a XTL plant, the Fischer-Tropsch reactors management of hydrogen, and the conversion of carbon based feedstock into hydrocarbon liquid transportation fuels, inter alfa. The following is a representative list of other such references. This includes: U.S. Pat. Nos. 7,776,114; 6,765,025; 6,512,018; 6,147,126; 6,133,328; 7,855,235; 7,846,979; 6,147,126; 7,004,985; 6,048,449; 7,208,530; 6,730,285; 6,872,753, as well as United States Patent Application Publication Nos. US2010/0113624; US2004/0181313; US2010/0036181; US2010/0216898; US2008/0021122; US 2008/0115415; and US 2010/0000153.

The Fischer-Tropsch (FT) process has several significant benefits when applied to a bitumen upgrader process, one benefit being that it is able to convert previously generated petcoke and residuum to valuable, high quality synthetic crude oil (SCO) and high quality refined products with notably increased paraffinic content. A further significant benefit is that the raw bitumen yield to refined products is near or greater than 100%, more specifically greater than 130% yield, a 35% to 65% product yield increase relative to certain current upgrader processes. Another benefit is that there is no petcoke and residuum waste product to impact the environment thus improving overall bitumen resource utilization.

A further benefit of the application of the FT process to a bitumen upgrader is that the FT byproducts can be partially and fully blended with the distilled, separated or treated fractions of the bitumen or heavy oil feed stream to formulate and enhance the quality of refinery products such as diesel and jet fuel. The significant overall benefit is the carbon conversion efficiency is greater than 90%, providing significant reduction in facility GHG emissions and 100% conversion of the bitumen or heavy oil resource without the formation of wasteful byproducts.

A further benefit of the application of the FT process to a bitumen upgrader is that a sweet, highly paraffinic and high cetane content synthetic diesel (syndiesel) is produced. More specifically, beneficial byproducts of the FT process such as paraffinic naphtha and FT vapours (such as methane and liquid petroleum gases (LPG)), have particular value within the bitumen upgrader process and upstream unit operations. FT vapours, virtually free from sulfur compounds can be used as upgrader fuel or as feedstock for hydrogen generation to offset the requirement for natural gas. FT naphtha, primarily paraffinic in nature, can also be used in the generation of hydrogen, but further, due to its unique paraffinic nature, it can also be used as an efficient deasphalting solvent not readily available from current upgrader operations.

It has also been well documented that the use of FT paraffinic naphtha as a solvent for an oil sands froth unit improves the operation and efficacy of fine tailings and water removal at a reduced diluent to bitumen (D/B) ratio and relatively low vapour pressure. This has significant advantages in terms of lowering the size and cost of expensive separators and settlers and increasing their separation performance and capacity rating. This results in virtually dry bitumen froth feed (<0.5 basic sediment and water) to the upgrader, while improving impact on the tailings pond.

Having thus generally discussed the appropriateness of the Fischer-Tropsch technique in synthesizing syngas to FT liquids, a discussion of the prior art and particularly the art related to the upgrading and gasifying of heavy hydrocarbon feeds would be useful.

One of the examples in this area of the prior art is the teachings of U.S. Pat. No. 7,407,571 issued Aug. 5, 2008, to Rettger et. al. This reference names Ormat Industries Ltd. as the Assignee and teaches a process for producing sweet synthetic crude oil from a heavy hydrocarbon feed. In the method, the patentees indicate that heavy hydrocarbon is upgraded to produce a distillate feed which includes sour products and high carbon byproducts. The high carbon content byproducts are gasified in a gasifier to produce a syngas and sour byproducts. The process further hydroprocesses the sour products along with hydrogen gas to produce gas and a sweet crude. Hydrogen is recovered in a recovery unit from the synthetic fuel gas. The process also indicates that further hydrogen gas is processed and hydrogen depleted synthetic fuel gas is also produced. Further hydrogen gas is supplied to the hydroprocessing unit and a gasifying step is conducted in the presence of air or oxygen. The gas mixture is scrubbed to produce a sour water and a clean sour gas mixture. The sour gas mixture is subsequently processed to produce a sweet synthetic fuel gas and a hydrogen enriched gas mixture from the synthetic fuel gas using a membrane. The overall process is quite effective, however, it does not take advantage of the conversion of synthesized streams which are useful for introduction into the hydroprocessing unit for production of synthetic crude, the recycling of unique streams for use in the upgrader, nor is there any teaching specifically of the integration of the Fischer-Tropsch process or the recognition of the benefit to the process of using a SMR and/or ATR in the process circuit to maximize SCO yields and reducing dependence on natural gas.

Iqbal et. al. in U.S. Pat. No. 7,381,320 issued Jun. 3, 2008, teaches a process for heavy oil and bitumen upgrading. In overview, the process is capable of upgrading crude oil from a subterranean reservoir. The process involves converting asphaltenes to steam power, fuel gas, or a combination of these for use in producing heavy oil or bitumen from a reservoir. A portion of the heavy oil or bitumen are solvent deasphalted to form an asphaltene fraction and a deasphalted oil, referred to in the art as DAO as a fraction free of asphaltenes and with reduced metals content. The asphaltene fraction from the solvent deasphalting is supplied to the asphaltenes conversion unit and a feed comprising the DAO fraction supplied to a reaction zone of a fluid catalytic cracking (FCC) unit with an FCC catalyst to capture a portion of the metals from the DAO fraction. A hydrocarbon effluent is recovered from this having a reduced metal content. Similar to the process taught in U.S. Pat. No. 7,407,571, this process has utility, however, it limits the conversion of the otherwise wasteful asphaltene to production of solid fuel or pellets or conversion to syngas for fuel, hydrogen or electric power production. There is no teaching specifically integrating the Fischer-Tropsch process.

In U.S. Pat. No. 7,708,877 issued May 4, 2010 to Farshid et. al. there is taught an integrated heavy oil upgrader process and in line hydro finishing process. In the process, a hydroconversion slurry reactor system is taught that permits a catalyst, unconverted oil and converted oil to circulate in a continuous mixture throughout a reactor with no confinement of the mixture. The mixture is partially separated between the reactors to remove only the converted oil while allowing unconverted oil in the slurry catalyst to continue on to the next sequential reactor where a portion of the unconverted oil is converted to a lower boiling point. Additional hydro processing occurs in additional reactors for full conversion of the oil. The so called fully converted oil is subsequently hydrofinished for nearly complete removal of heteroatoms such as sulfur and nitrogen.

This document is primarily concerned with hydroconversion of heavy hydrocarbon, while not being suitable for bitumen upgrading. It also fails to provide any teaching regarding the use of Fischer-Tropsch process, usefulness of recycle streams, hydrogen generation or other valuable and efficient unit operations critical to successful upgrading of raw bitumen.

Calderon et. al. in U.S. Pat. No. 7,413,647 issued Aug. 19, 2008, teach a method and apparatus for upgrading bituminous material. The method involves a series of four distinct components, namely a fractionator, a heavy gas oil catalytic treater, a catalyst regenerator/gasifier and a gas clean up assembly. The patent indicates that in practicing the method, the bitumen in liquid form is fed to the fractionator for primary separation of fractions with the bulk of the bitumen leaving the bottom of the fractionator in the form of a heavy gas oil which is subsequently pumped to the catalytic treater and sprayed on a hot catalyst to crack the heavy gas oil, thus releasing hydrocarbons in the form of hydrogen rich volatile matter while depositing carbon on the catalyst. The volatile matter from the treater is passed to the fractionator where condensable fractions are separated from noncondensable hydrogen rich gas. The carbon containing catalyst from the treater is recycled to the regenerator/gasifier and the catalyst, after being regenerated is fed hot to the treater.

The method does not incorporate the particularly valuable Fischer-Tropsch process or provide a unit for effecting the Fischer-Tropsch reaction and further, the method is limited by the use of the catalyst which would appear to be quite susceptible to sulfur damage and from this sense there is no real provision for handling the sulfur in the bitumen.

In United States Patent Application, Publication No. US 2009/0200209, published Aug. 13, 2009, Sur)) et. al. teach upgrading bitumen in a paraffinic froth treatment process. The method involves adding a solvent to a bitumen froth emulsion to induce a settling rate of at least a portion of the asphaltenes and mineral solids present in the emulsion and results in the generation of the solvent bitumen-froth mixture. Water droplets are added to the solvent bitumen-froth mixture to increase the rate of settling of the asphaltenes and mineral solids. The focus of the publication is primarily to deal with the froth. There is no significant advance in the upgrading of the bitumen.

A wealth of advantages are derivable from the technology that has been developed and which is described herein. These are realized in a number of ways including:

a) near 100% or greater yield of total refinery products slate from heavy oil or bitumen without the wasteful production of petcoke or residuum;

b) high quality synthetic hydrocarbon byproducts such as synthetic naphtha, syndiesel, synjet, synthetic lubes and synthetic wax is produced to highest quality commercial standards;

c) maximum utilization of carbon in heavy oil and bitumen to form high quality synthetic hydrocarbon byproducts, with the significant reduction (greater than 50%) in GHG from the facility;

d) the distilled and treated streams are substantially void of undesirable chemical and physical properties such as heavy metals, sulfur, Conradson Carbon (CCR) and naphthenic acid (TAN number);

e) less natural gas is required to generate hydrogen for upgrading as the FT naphtha, refinery fuel gas, LPG, FT vapours and hydroprocessing vapours can be recycled to generate a hydrogen rich syngas;

f) pure hydrogen can be generated from the hydrogen rich syngas using membranes, absorption or pressure swing adsorption units, for use in the hydroprocessing (hydrocracking, isomerisation, hydrotreating) units;

g) Fischer-Tropsch (FT) liquids are primarily paraffinic in nature improving the quality and value of refinery product slate;

h) FT naphtha is rarely available in any quantity in current upgraders and would be very preferentially used for deasphalting distilled bottoms in a Solvent Deasphalting Unit (SDA) and in a oil sands Froth Treatment Unit; and i) concentrated $CO_2$ is available from the gasifier (XTL) syngas treatment unit, allowing the upgrader to be a low cost carbon capture ready $CO_2$ source for carbon capture and sequestration (CCS) projects.

As part of the further advancements that are within the ambit of the technology set forth herein, the refinery aspect is addressed.

In this embodiment of the invention, a process is elucidated to fully upgrade light crude oil typically having an API density of between 22 and 40 and heavy oil with an API density of between 12 to 22 or extra heavy oil or bitumen with a density of less than API 12 API without the production of undesirable hydrocarbon byproduct, such as petcoke, heavy fuel oil or asphalt. The process combines the Fischer Tropsch hydrocarbon synthesis unit with conventional refinery processing steps to produce full commercial specification refined products, such as, but not limited to, naphtha for petrochemicals feedstock, naphtha for gasoline blending, gasoline, diesel, jet fuel, lubricants, wax, inter alfa.

Generally, conventional or simple topping, hydroskimming and light conversion refineries are designed to receive sweet or sour light crude oils >22 API, more specifically 30 to 40 API density for the production of refined fuels. Light refineries are primarily focused on production of gasoline, jet and diesel fuel and if required, the refinery will manage refinery bottoms as asphalt or fuel oil sales. Usually the volume of bottoms is minimal for crude densities greater than 30 API.

In recent years the supply and availability of light crude oil has fallen appreciably and become very costly relative to discounted heavier crude costs. Many conventional refineries have been recently reconfigured to medium conversion refineries to accept further lower cost heavy crude oils (20 to 30 API) resulting in higher fractions of the crude oil converting to residue and being converted to asphalt, sour heavy fuel oil or petcoke. In addition, many refineries have been forced to further upgrade the hydrotreating facilities to produce ultra-low sulfur gasoline (ULSG) and ultra-low sulfur diesel (ULSD) to meet tighter regulatory commercial market specifications. Economics of these modified refineries have become very challenging due to significant capital and processing costs without additional product yield or significant revenue gain.

To further complicate issues, the large volumes of low value world crude oil supplies now take the form of extra heavy crude (12 to 22 API) or bitumen (6 to 11 API) sources from in situ or mining oilsands operations. Complex refinery conversions are now required, involving the addition of deep conversion refinery units such as deep hydrocracking and coking, to accommodate the extra heavy oil and bitumen feeds. These deep conversion refineries, are capital intense and produce significantly lower value byproducts such as petcoke with significant increased emissions of GHG (Green House Gases). Refinery product yields based on extra heavy and bitumen crude oil are about 80 to 90 volume %.

Petcoke has undesirable properties, such as difficult and costly handling, storage and transportation requirements, major environmental impact and contains high levels of sulfur (6+wt %) as well as toxic heavy metals such as nickel and vanadium (1000 ppm+). Therefore petcoke has limited markets and is often a commercial and environmental liability as it is stored or marketed at very low or negative returns.

As the world oil supply transitions more towards the supply of extra heavy oil (12 to 20 API) and bitumen (6 to 12 API), the vacuum bottoms approaches 60 vol % of the whole crude assay. Accordingly, there is a need for an improved process to convert all the heavy oil and bitumen feed to commercial high value product without the production of byproducts such as petcoke and CO2 (GHG), with reduced impact on the environment.

The refinery process to be discussed addresses the needs in this area. Advantages attributable to the process include:

a) Transformation of refiner bottoms, typically >950+F material to synthetic fuels such as FT naphtha, synthetic diesel, synthetic jet fuel, synthetic lube oils, waxes, etc.;

b) Elimination of the production of low value hydrocarbon byproducts such as heavy fuel oil, road asphalt and petcoke, resulting in full (100 wt %) utilization of the crude feed regardless of density or blended densities of crude slate;

c) Retention and conversion of greater than 90% of all carbon in the feed streams (i.e. crude oil, natural gas, etc) resulting in greater than 50% reduction in CO2 or GHG emissions; and d) Substantial reduction of the Conradson Carbon (CCR), Naphthenic Acid (TAN) and heavy metals and significant amount of sulfur from the main conventional refinery processes. This is advantageous since it permits the use of lower cost, conventional hydroprocessing units (hydrocrackers) with single or multiple fixed bed catalyst systems to upgrade the heavy fractions to high value refinery fuels.

SUMMARY OF THE INVENTION

One object of the present invention is to provide an improved heavy oil and bitumen upgrading methodology for producing refined products and synthesizing hydrocarbons with a substantially increased yield without the production of waste byproducts such as petcoke or residuum.

A further object of one embodiment of the present invention is to provide a process for upgrading heavy oil or bitumen to formulate refined hydrocarbon byproducts, comprising:

(a) providing a feedstock source of heavy oil or bitumen;

(b) treating said feedstock to form a distilled fraction and non-distilled bottoms fraction;

(c) feeding said bottoms fraction to a syngas generating circuit for formulating a hydrogen lean syngas stream via a partial oxidation reaction and reacting said syngas in a Fischer-Tropsch reactor to synthesize hydrocarbon byproducts;

(d) removing at least a portion of fully refined hydrocarbon byproduct for commercial application; and (e) adding an external source of hydrogen to said hydrogen lean syngas to optimize the synthesis of hydrocarbons at least one of which is synthetic hydrocarbon byproduct.

A further object of one embodiment of the present invention is to provide a process for upgrading heavy oil or bitumen to formulate refined hydrocarbon byproducts, comprising:

(a) providing a source of bitumen or heavy oil feedstock and treating said feedstock with distillation to form a distilled and non-distilled bottoms fraction;

(b) feeding the non-distilled bottoms fraction to a syngas generating circuit for formulating a hydrogen lean syngas stream via a partial oxidation reaction;

(c) treating at least a portion of the said hydrogen lean syngas stream to a water gas shift (WGS) reaction to generate an optimum Fischer-Tropsch syngas;

(d) treating said optimum Fischer-Tropsch syngas stream in a Fischer-Tropsch unit to synthesize hydrocarbon byproducts and;

(e) removing at least one of upgraded portion of fully refined synthetic hydrocarbon byproducts for commercial application.

The present technology mitigates the oversights exemplified in the prior art references. Despite the fact that the prior art, in the form of patent publications, issued patents, and other academic publications, all recognize the usefulness of a Fischer-Tropsch process, steam methane reforming, autothermal reforming, hydrocarbon upgrading, synthetic oil formulation, stream recycle, and other processes, the prior art when taken individually or when mosaiced is deficient a process that provides the efficient upgrading of bitumen and heavy oil in the absence of residuum and/or petcoke generation.

Synthetic crude oil (SCO) and refined hydrocarbon byproducts, such as naphtha, gasoline, diesel and jet fuel is the output from a bitumen/heavy oil upgrader facility used in connection with bitumen and heavy oil from mineable oilsands and in situ production. It may also refer to shale oil, an output from an oil shale pyrolysis. The properties of the synthetic crude or refined hydrocarbon byproducts depend on the processes used in the upgrading configuration. Typical full upgraded SCO is devoid of sulfur and has an API gravity of around 30 to 40, suitable for conventional refinery feedstock. It is also known as "upgraded crude". The processes delineated herein are particularly effective for partial upgrading, full upgrading or full refining to gasoline, jet fuel and diesel fuel. Conveniently, the flexibility of the processes allows for fuel synthesis and synthetic crude oil partial upgrading within the same protocol or the partial upgrading as the entire process.

The present invention amalgamates, in a previously unrecognized combination, a series of known unit operations into a much improved synthesis route for a high yield, high quality production of synthetic hydrocarbons. Integration of a Fischer-Tropsch process, and more specifically the integration of a Fischer-Tropsch process with a hydrogen rich syngas generator which uses FT naphtha and/or FT upgrader vapours as primary fuel in combination with natural gas, in a steam methane reformer (SMR) and/or an autothermal reformer (ATR) results in a superior sweet synthetic hydrocarbon byproduct which is synthesizable in the absence of petcoke and residuum.

It was discovered that, by employing a steam methane reformer (SMR) as a hydrogen rich syngas generator using Refinery Fuel, Refinery LPG, FT LPG, FT naphtha and FT/upgrader vapours, in combination with natural gas, significant results can be achieved when blended with the hydrogen lean syngas created by the gasification of non-distilled or treated bitumen or heavy oil bottoms. A significant production increase in middle distillate synthetic hydrocarbons range is realized. The general reaction is as follows;

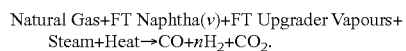
$$\text{Natural Gas} + \text{FT Naphtha}(v) + \text{FT Upgrader Vapours} + \text{Steam} + \text{Heat} \rightarrow CO + nH_2 + CO_2.$$

As is well known to those skilled in the art, steam methane reforming may be operated at any suitable conditions to promote the conversion of the feedstreams, an example as shown in above equation, to hydrogen $H_2$ and carbon monoxide CO, or what is referred to as syngas or specifically as hydrogen rich syngas. Significant benefits resulted in greater than 100% increase in middle distillate synthesized hydrocarbon. Steam and natural gas is added to optimize the desired ratio of hydrogen to carbon monoxide to approximate range of 3:1 to 6:1. External CO2 can optionally be added to minimize the formation of undesirable CO2 and maximize the formation of CO in the hydrogen rich syngas. A water gas shift reaction (WGS), pressure swing adsorption (PSA) or membrane unit can also be added to any portion of the SMR syngas circuit to further enrich the hydrogen rich stream and generate a near pure hydrogen stream for hydroprocessing use. Generally natural gas, FT Vapours, Refinery Gas or any other suitable fuel is used to provide the heat energy for the SMR furnace.

The steam reformer may contain any suitable catalyst, an example of one or more catalytically active components such as palladium, platinum, rhodium, iridium, osmium, ruthenium, nickel, chromium, cobalt, cerium, lanthanum, or mixtures thereof. The catalytically active component may be supported on a ceramic pellet or a refractory metal oxide. Other forms will be readily apparent to those skilled.

It was further discovered that employing an autothermal reformer (ATR) as a sole hydrogen rich syngas generator or in combination with the SMR or as a hybrid combination of an ATR/SMR referred to as a XTR, significant benefits resulted in a greater than 200% increase in the FT middle distillate synthetic hydrocarbons. Feedstreams for the ATR or XTR consist of FT naphtha, FT vapours, $H_2$ rich upgrader vapours, $CO_2$, $O_2$ and natural gas.

Similarly, as is well known to those skilled in the art, autothermal reforming employs carbon dioxide and oxygen, or steam, in a reaction with light hydrocarbon gases like natural gas, FT vapours and upgrader vapours to form syngas. This is an exothermic reaction in view of the oxidation procedure. When the autothermal reformer employs carbon dioxide, the hydrogen to carbon monoxide ratio produced is 1:1 and when the autothermal reformer uses steam, the ratio produced is approximately 2.5:1, or unusually as high as 3.5:1.

The reactions that are incorporated in the autothermal reformer are as follows:

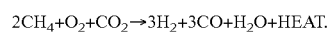
$$2CH_4 + O_2 + CO_2 \rightarrow 3H_2 + 3CO + H_2O + HEAT.$$

When steam is employed, the reaction equation is as follows:

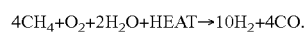
$$4CH_4 + O_2 + 2H_2O + HEAT \rightarrow 10H_2 + 4CO.$$

One of the more significant benefits of using the ATR is realized in the variability of the hydrogen to carbon monoxide ratio. An additional significant benefit of using the ATR is that external $CO_2$ can be added to reaction to effect a reverse shift reaction to create additional carbon monoxide for enhancement of the FT synthesis unit and reduction of overall facility GHG emissions. In the instant technology, an ATR may also be considered as a hydrogen rich syngas generator, as described previously. It has been found that the addition of the ATR operation to the circuit separately or in combination with the hydrogen rich syngas generation circuit, shown in the example above as a steam methane reformer (SMR), has a significant effect on the hydrocarbon productivity from the overall process. Similarly, a water gas shift reaction (WGS), pressure swing adsorption (PSA) or membrane unit can also be added to any portion of the ATR and combined ATR/SMR or XTR syngas circuit to further enrich the hydrogen rich stream and generate a near pure hydrogen stream for hydroprocessing use.

The present invention further amalgamates, in a previously unrecognized combination, a series of known unit operations to integrate the Fischer-Tropsch process, using a water gas shift reaction for syngas enrichment resulting in a valuable sweet synthetic hydrocarbon byproduct which is synthesizable in the absence of petcoke and residuum.

Accordingly, it is another object of one embodiment of the present invention to provide the process, wherein the water gas shift reactor (WGS) is introduced to at least a protion of the hydrogen lean syngas stream to optimize the hydrogen content for the Fischer-Tropsch process.

Referring now to the drawings as they generally describe the invention, reference will now be made to the accompanying drawings illustrating preferred embodiments.

BRIEF DESCRIPTION OF THE DRAWINGS

FIG. 1 is a process flow diagram of methodology known in the prior art for processing of mineable and in situ heavy oil and bitumen;

FIG. 2 is a process flow diagram similar to FIG. 1, illustrating a further technique known in the art;

FIG. 3 is a process flow diagram illustrating a further variation of the prior art technology;

FIG. 4 is a process flow diagram illustrating a further variation of the prior art technology;

Similar numerals employed in the figures denote similar elements.

DETAILED DESCRIPTION OF THE PREFERRED EMBODIMENTS

Figure 5:
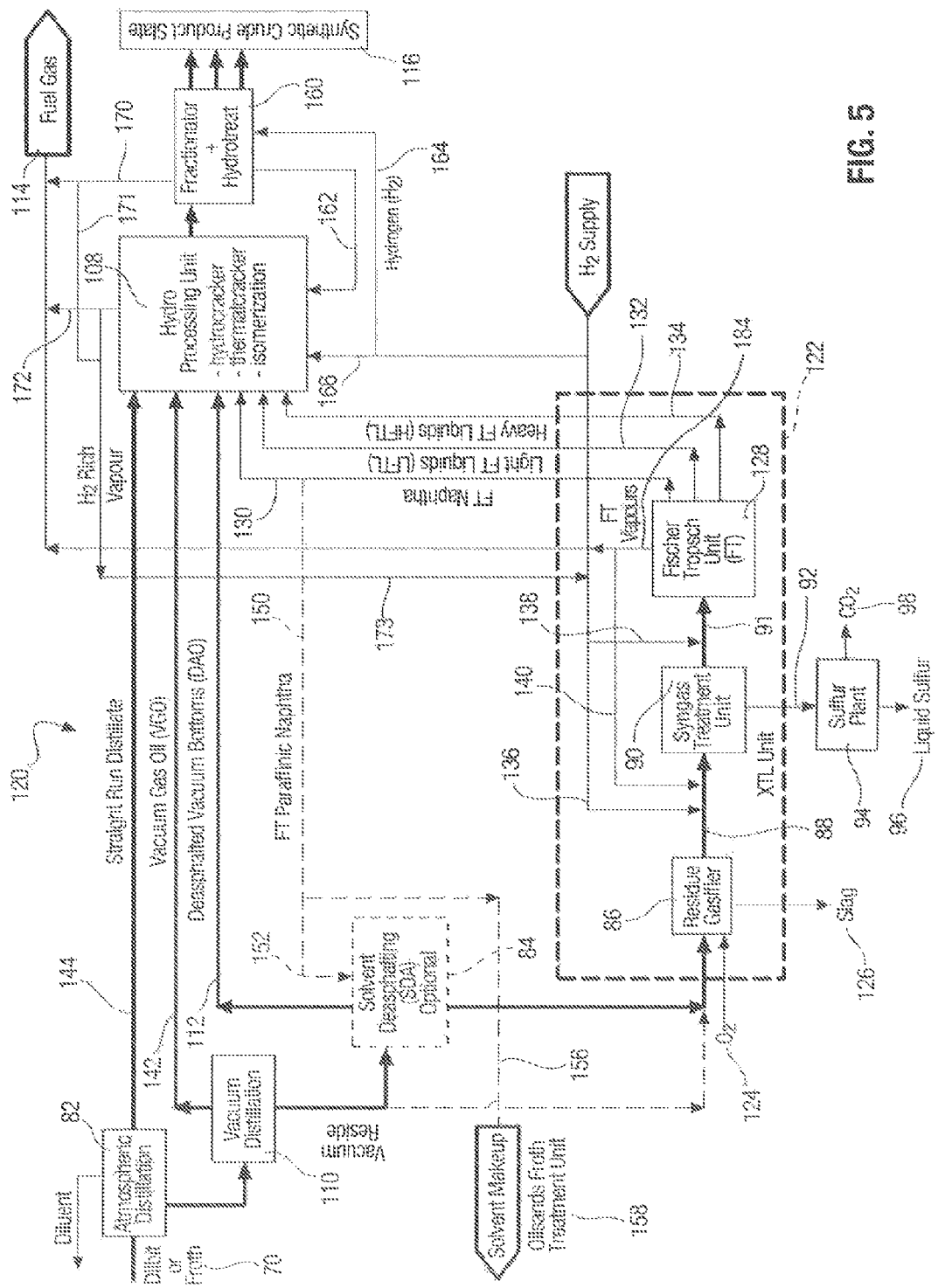
FIG. 5 is a process flow diagram illustrating an embodiment of the present invention.

Referring now to FIG. 1, shown is a first embodiment of a bitumen production flow diagram based on the prior art. The overall process is denoted by 10. In the process, the heavy oil or bitumen source 12 may comprise a bitumen reservoir which may be minable or in situ. Generally speaking, the bitumen then may be transported to a heavy oil or bitumen production unit 14 into which diluent or solvent may be introduced via line 16 from a heavy oil or bitumen upgrader 18. The diluent or solvent can comprise any suitable material well known to those skilled in the art such as suitable liquid alkanes as an example. Once the diluent is introduced via line 16 into the production unit 14, the result is a mobilizable bitumen blend (dilbit). Once the dilbit or diluted bitumen blend is processed in the upgrader 18, the so formed synthetic crude, globally denoted by 20 is then treated in a petroleum refinery 22 where subsequently refined products are formulated and with the refined products being globally denoted by 24.

The production unit 14 primarily removes water and solids from the stream. The diluent or solvent 16 is added to the raw bitumen to provide for the necessary mobilization and separation parameters, primarily providing a reduction in viscosity. In a situation where the bitumen is an oil sand derived bitumen, water is added to the raw material to provide a slurry for transport to the extraction and froth treatment plant and upgrader 18, as further described in FIG. 2. Dewatered bitumen is then transported by pipeline (not shown) as a diluent blend or dilbit to the upgrader 18. The dry raw bitumen is treated to primary and secondary treatment to create a sweet or sour crude oil (SCO). The SCO is transported to the petroleum refinery 22 to be further processed into refined product 24 as indicated above, examples of which include transport fuel such as gasoline, diesel and aviation fuels, lube oils and other feedstocks for petrochemical conversion.

With respect to FIG. 2, shown is a schematic process flow diagram of oil sands operation for bitumen upgrading. The overall process in this flow diagram is indicated by 30. Other than the embodiment shown, the system relates to a minable oil sands bitumen production process where raw mined oil sands ore, generally denoted by 32, from the mine are mixed with water 34 in an ore preparation unit 36 and subsequently hydrotransported to a primary extraction plant, denoted by 38. In the extraction plant 38, the greater portion of water 34 and course tailings 40 are separated and returned to a tailings pond 42.

Partially dewatered bitumen, generally denoted by 44 is transferred to a froth treatment unit 46. This is where a solvent, typically highly aromatic naphtha (derived from bitumen) or paraffinic solvent (derived from natural gas liquids) is added at 48 to separate the remaining water and refined clays as well as fine tailings. The froth is then treated in a solvent recovery unit 52 where the majority of the solvent is recovered for recycle to the froth treatment unit. The separated fine tailings passes through a tailings solvent recovery unit 50 for final recovery of solvent. The fine tailings are transferred into the tailings pond 42. The clean dry froth is then introduced into the bitumen upgrader, generally denoted by 54 and illustrated in FIG. 2 in dashed line. Generally speaking the bitumen upgrader 54 incorporates two general processes, a primary and secondary upgrading. The primary upgrader typically consists of two processing methodologies. The first, namely, carbon rejection or coking where the heavy fraction of the bitumen is removed as petcoke. Generally, the synthetic crude oil yield is between about 80 to about 85% by volume and the remaining portion converted primarily by petcoke is returned for storage to the mine. Further the coking process is a severe processing method and leads to higher aromatic content in the synthetic crude oil. The second process, namely hydrogen addition, uses a slurry based catalytic hydroprocessing system with the addition of hydrogen to treat the bitumen blend and produce an unconverted asphaltene reject stream and a synthetic crude oil product. The volume yield of the synthetic crude oil typically is 95% to 103% due to product swelling.

The hydrocarbon product streams from primary upgrading are further treated in secondary upgrader, consisting of hydrotreating units using hydrogen to stabilize synthetic crude products generally indicated as 56 and reduce sulfur and nitrogen impurities. Natural gas is used in a hydrogen unit to generate hydrogen requirements for the upgrader and co-generate electric power for upgrader use. The overall operations in the bitumen upgrader are indicated within the dash lines and these operations are well known to those skilled in the art.

Turning to FIG. 3, shown is a further partial upgrading process known in the prior art, in this arrangement, the process flow diagram delineates an in situ bitumen production unit. The overall process is denoted by 60. In such an arrangement, the in situ heavy oil or bitumen is exposed to steam to extract the oil. The raw bitumen 62 is treated in a conventional SAGD or CSS plant 64 to remove water 66. Diluent 68 is typically added to raw bitumen 62 in plant 64 to create water oil separation and to further provide a diluted blend for pipeline transportation, more commonly referred to in the art as "dilbit" denoted by 70. The dilbit can be transported over long distances in a pipeline (not shown) to remote refineries where it is blended with conventional crude as a feedstock. More integrated configurations may use distillation, deasphalting or visbreaking, a processing to create a near bottomless sour heavy crude for feed to refineries. This operation creates an asphaltene or vacuum residue stream requiring disposal. This partially upgraded bitumen is suitable for pipeline transportation for heavy oil feed streams greater than 15 API. For heavy oil and bitumen feed streams less than 15 API, some quantity of diluent is still required to meet crude pipeline specifications. The dilbit is processed in a bitumen partial upgrader denoted by 72 with the operations being shown within the dashed line box. The transportable bitumen is denoted by 74 in FIG. 3. The diluent is often separated at the refinery and returned to the in-situ operation resulting in significant overall inefficiencies. The option to this is external makeup diluent is provided locally at a significant expense.

As will be appreciated by those skilled, the process variations shown in FIGS. 1 through 3 of existing bitumen and heavy oil production facilities either create a waste product such as petcoke or residuum which leads to significant losses or further requires significant quantities of hydrogen or diluent to upgrade the product in order to be suitable as a refinery feedstock. Essentially, the existing processes do not provide a technology capable of capturing the full intrinsic value of the bitumen or heavy oil and has resulted in environmental impact related to disposal and management of undesirable waste products.

Turning to FIG. 4, shown is a further variation in the prior art of an enhanced bitumen upgrading process. It is the subject matter of Canadian Patent No. 2,439,038 and its United States homolog, U.S. Pat. No. 7,407,571 issued to Rettger, et. al. (Ormat Industries Ltd.).

The overall process is denoted by 80.

Dilbit or froth 70 is introduced into an atmospheric distillation unit 82 with the non-distilled heavy bottoms being transported and introduced into a solvent deasphalting unit (SDA) 84 and the asphaltene bottoms are then subsequently fed into a gasifier 86, which gasifier is within the Ormat gasification unit, globally denoted by 88. The deasphalted material, commonly denoted as DAO is transferred to the hydroprocessing unit 108 for upgrading to synthetic crude oil. As an option, there may be a vacuum distillation unit 110 in the circuit which may introduce captured vacuum gasoils for introduction into hydroprocessing unit 108. Similarly, the vacuum bottoms are introduced into the SDA 84 to optimize process configuration.

The sour syngas generated by the gasification unit is then passed into a syngas treater 90 for acid gas removal. The acid gas is removed at 92 and treated in sulfur plant 94 producing at least products such as liquid sulfur 96 and $CO_2$ 98. The treated or "sweet" syngas is then processed in a water gas shift reaction (WGS) process as denoted in the FIG. 4 and referred to as a CO shift reactor 100. Steam 102 is augmented in the reactor 100. The water gas shift reaction is merely a shift from the CO to $CO_2$ to create a hydrogen rich syngas. The hydrogen rich syngas may be then further treated in a typical pressure swing unit (PSA) or a membrane unit where the hydrogen is concentrated to greater than 99 percent. It occurs in unit 104. The hydrogen generated by 104, denoted by 106 is then the feedstock for the hydroprocessing unit 108. Once the hydroprocessing occurs, the result is synthetic crude oil (SCO) denoted by 116 representing about 95 vol % yield and fuel gas denoted by 114.

Returning briefly to the hydrogen recovery unit 104, the byproduct of the unit 104 is a tailgas or a low BTU syngas which is used in the SAGD thermal steam generators as fuel to offset the need for natural gas as the primary fuel. The process has merit in that if natural gas is in short supply or there can be significant historic price fluctuation, the enhanced upgrader process is less dependent on the natural gas and can rely on the synthesized fuel for the overall process benefits.

Turning to FIG. 5, shown as a first embodiment of an enhanced bitumen upgrading circuit process incorporating Fischer-Tropsch technology and hydrogen synthesis. The embodiment of the overall process is denoted by 120. The overall process is particularly beneficial relative to the processes that were previously proposed in the prior art in that sweet carbon rich syngas is not passed through a water gas shift reaction, as denoted as 100 in FIG. 4, but rather is supplemented with external hydrogen 138 to create the optimum syngas composition, typically a ratio of hydrogen to carbon monoxide of greater than 1.8:1 to 2.2:1, and preferred as 2:1 as feed to Fischer-Tropsch reactor for producing high quality paraffinic Fischer-Tropsch liquids.

It is by the recognition of the usefulness of the Fischer-Tropsch reactor together with the avoidance of waste petcoke/residuum generation and the subsequent hydrogen source addition to maximize conversion of gasified carbon, that draws the proposed interim technology into the realm of being economical, convenient and highly efficient given the yields that are generated for the synthetic crude oil (SCO), greater than 115 vol %, and more specifically greater than 135 vol %.

As is evident, there are a number of unit operations which are common with those in the prior art, namely the atmospheric distillation, vacuum distillation, solvent deasphalting, hydroprocessing, gasification, and syngas treatment.

In the embodiment shown, the Ormat gasification, commonly denoted as unit 88 and discussed with respect to FIG. 4 is replaced with a further sequence of operations (the XTL operations) shown in dashed lines and indicated by 122. In this embodiment, the gasifier 86 converts the non-distilled bottoms residue with typically oxygen ($O_2$) 124 to generate a hydrogen lean or carbon rich syngas 88 having a hydrogen to carbon dioxide ratio in range of 0.5:1 to 1.5:1, more specifically about 1:1, an example of which is shown in Table 1.

TABLE 1

Typical XTL Gasifier Hydrogen Lean Syngas Compositions

| | Feedstock Type | | |
|---|---|---|---|
| Syngas Composition (mole %) | Heavy Fuel Oil | Vacuum Residue | Asphaltene |
| CarbonDioxide ($CO_2$) | 2.75% | 2.30% | 5.0% |
| Carbon Monoxide (CO) | 49.52% | 52.27% | 50.4% |
| Hydrogen ($H_2$) | 46.40% | 43.80% | 42.9% |
| Methane ($CH_4$) | 0.30% | 0.30% | 0.3% |
| Nitrogen (+Argon)($N_2$) | 0.23% | 0.25% | 0.4% |
| Hydrogen Sulfide ($H_2S$) | 0.78% | 1.08% | 1.0% |

A common byproduct, containing heavy metals and ash, from the gasification is discharged as slag denoted as 126. The hydrogen lean syngas 88 is then passed into the syngas treatment unit 90 for removal of acid gases 92 to create a sweet hydrogen lean syngas 91. Additional scrubbing, adsorption and washing technologies (not shown), well known to those skilled in the art, are typically employed to ensure that the sweet syngas is devoid of contaminants such as sulfur compounds which will have significant detrimental impact on the Fischer-Tropsch catalyst. The acid gas is further treated in the sulfur plant 94 to generate elemental sulfur 96 and carbon dioxide ($CO_2$) as was the case with respect to the process of FIG. 4. The sweet hydrogen lean syngas 91 is then passed into a Fischer-Tropsch unit reactor denoted by 128. As a possibility, the hydrocarbon by products that are formed subsequently to reaction within the Fischer-Tropsch reactor 128 includes Fischer-Tropsch vapours 184 ($CO+H_2+C1+C2+C3+C4$), naphtha 130, light Fischer-Tropsch liquids 132 (LFTL) and heavy Fischer-Tropsch liquids (HFTL) 134 or commonly know as FT wax.

In order to trim or improve the efficiency of the overall process, the XTL unit 122 and specifically in advance of the syngas treatment unit 90 and/or the Fischer-Tropsch reactor 128 may be augmented with an external supply of hydrogen, indicated by 136 and 138, respectively. Further, at least some of the vapour from the Fischer-Tropsch reactor may be reintroduced in advance of the syngas treatment unit 90 as indicated by 140, and/or be used a fuel 114 in the upgrader. The liquids 130, 132 and 134 are introduced into hydroprocessing unit 108. This may also be augmented by straight run distillate naphtha 144 may be introduced from atmospheric distillation operation 82, vacuum gas oil (VGO) 142 from the vacuum distillation operation 110 and optionally, deasphalted oil 112 (DAO) from the SDA unit 84. A range of hydroprocessing treatments 108, as an example, hydrocracking, thermal cracking, isomerization, hydrotreating and fractionation, may be applied to the combined streams, individually or in desired combinations, well known to those skilled in the art, to create at least the synthetic crude oil product 116. As further options, any portion of the Fischer-Tropsch naphtha 130 particularly the paraffinic naphtha indicated by 150 may be reintroduced into the deasphalting unit 84 at 152 or further distributed as the solvent make up 156 for introduction into the oil sands froth treatment unit (not shown but generally noted by 158).

Further, additional hydrogen may be introduced into the hydroprocessing unit 108 and hydrotreating unit 160 at 166 and 164. The hydrogen supply may be taken from the hydrogen supply noted herein previously. From each of the fractionator, hydrotreater 160, hydroprocessing unit 108 and Fischer-Tropsch unit 128, product from each of these operations denoted by 170 or 172, 184 respectively is introduced to fuel gas 114. Further, a portion of 172 and 170 rich in hydrogen may be combined with the hydrogen lean syngas at 88 or 91 to enrich this stream for optimum performance of the Fischer-Tropsch unit.

Figure 6:
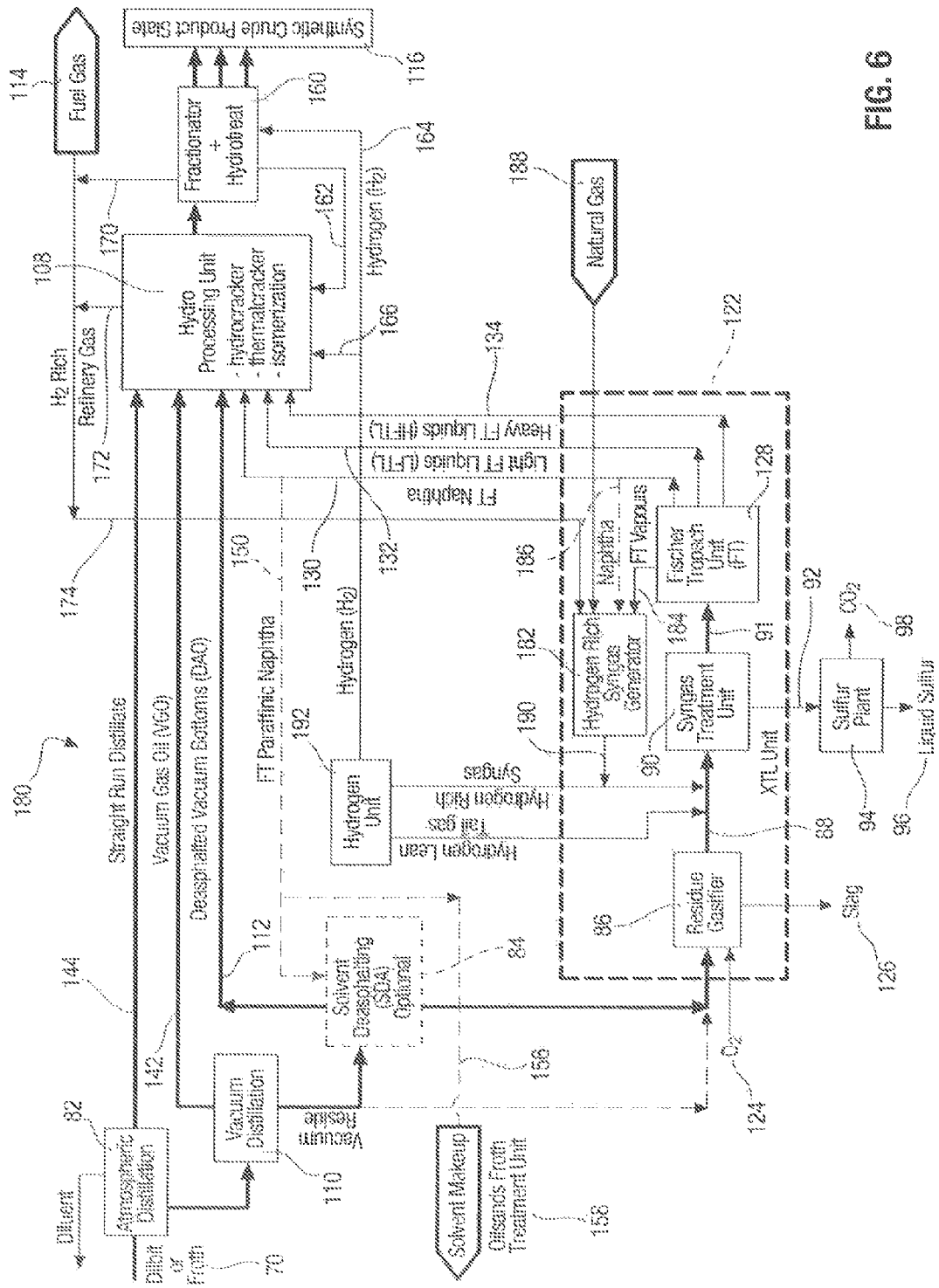
FIG. 6 is a process flow diagram illustrating a further embodiment of the present invention.

Turning to FIG. 6, shown in the process flow diagram is yet another variation on the methodology of the instant invention. The overall process in this embodiment is denoted by 180. Similar unit operations from those established in FIGS. 4 and 5 are applicable in FIG. 6.

The primary changes with respect to FIG. 5 versus FIG. 6, includes modification of the XTL, unit 122 and incorporation of hydrogen rich syngas generation and recycle of hydrogen rich syngas generated in the Fischer-Tropsch unit 128.

In greater detail, the XTL, unit 122 is modified to incorporate a hydrogen rich syngas generator, denoted by 182. The hydrogen rich syngas generator 182 is typically composed of a steam methane reformer (SMR) (not shown) or an auto thermal reformer (ATR) (not shown) and combinations thereof. Natural gas 188, Fischer-Tropsch vapours 184, hydrogen rich fuel gas 174, etc. from the hydroprocessor 108 and fractionation unit 160 and Fischer-Tropsch naphtha 186 may be supplied individually or in combination to unit 122 to generate hydrogen rich syngas 190 where the ratio between the hydrogen and the carbon monoxide is in range of 2:5 to 6:1. This is an important aspect of the invention and works in concert with the Fischer-Tropsch 128 to provide the effective results realized by practicing the technology as discussed herein with respect to FIGS. 5 through 6. Natural gas 188, depending on the current market situation at any location or time, may be used as a primary feedstock to the hydrogen rich syngas generator 182 and the steams 174, 130 and 184 may be used to maximize upgrader operation. Alternately, if the natural gas market is less favourable, streams 174, 130 and 184 may be fully utilized to offset the need for natural gas. The hydrogen rich syngas 190 can be introduced in advance of the syngas treatment unit 90 at 190 if treatment is required, or alternately, any portion of the hydrogen rich syngas 190 may be routed directly to the Fischer-Tropsch unit 128.

In this manner, the hydrogen rich syngas 190 is combined with the carbon rich syngas to create an optimum Fischer-Tropsch syngas where the ratio of the hydrogen to carbon monoxide is preferred 2:1. The combined feed streams to unit 122 reduces the amount of natural gas needed to achieve the optimum Fischer-Tropsch feed stream, thereby offering a commercial advantage of the upgraders dependence on natural gas, but also takes advantage of current low cost supply of natural gas.

Additionally, a portion of the hydrogen rich syngas 190 can be introduced to hydrogen unit 192 where a purified hydrogen stream 164 is generated for use in the hydroprocessing unit 108 and fractioning/hydrotreating unit 160. The hydrogen unit 192 may consist of a pressure swing adsorption (PSA), membrane or absorption technology, well known to those skilled in the art.

Figure 7:
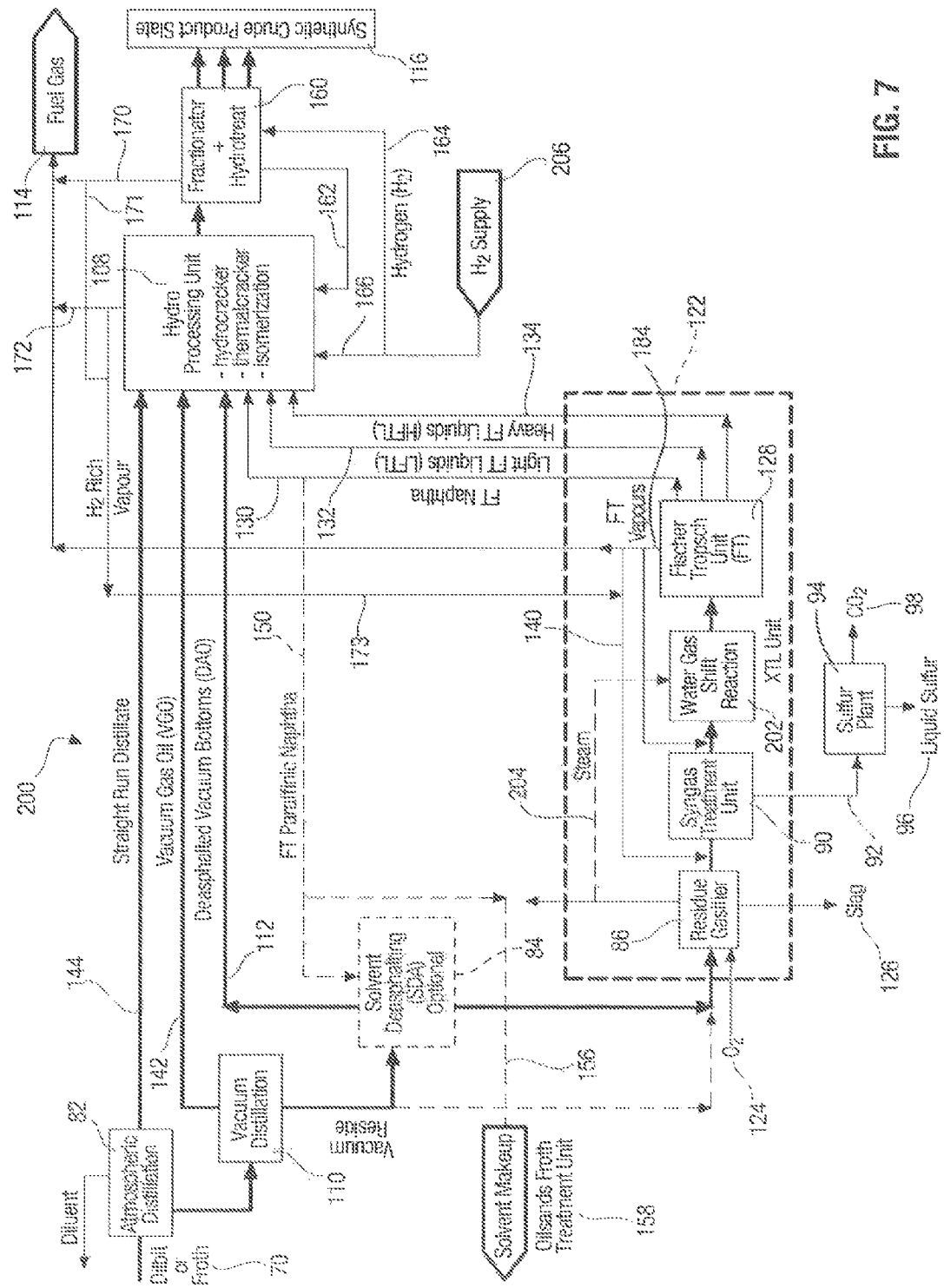
FIG. 7 is a process flow diagram illustrating yet another embodiment of the present invention.

Turning to FIG. 7, the process flow diagram illustrates a further variation on the overall concept of the present invention and in this manner, the XTL unit 122 undergoes further variation where the hydrogen unit 192 and hydrogen rich syngas generator 182 inherent in the embodiment FIG. 6 are replaced with a water gas shift (WGS) reaction unit operation. The overall process of FIG. 7 is denoted by 200. The water gas shift unit is denoted by 202 and is disposed between the syngas treatment unit 90 and the Fischer-Tropsch unit 128 processing at least a portion of the sour or sweet syngas. As is known in the art and particularly by those skilled, the water gas shift reactor is useful to enrich the raw syngas which, in turn, results in optimization of the hydrogen to carbon monoxide ratio for the Fischer-Tropsch syngas. Steam supply for the WGS reaction unit 202 may be provided from the gasifier 86 shown as 204. Additionally, hydrogen rich gas 171 and 173 from the hydroprocessor units may be combined with the FT vapours 140 to enrich the FT syngas feed.

Figure 8:
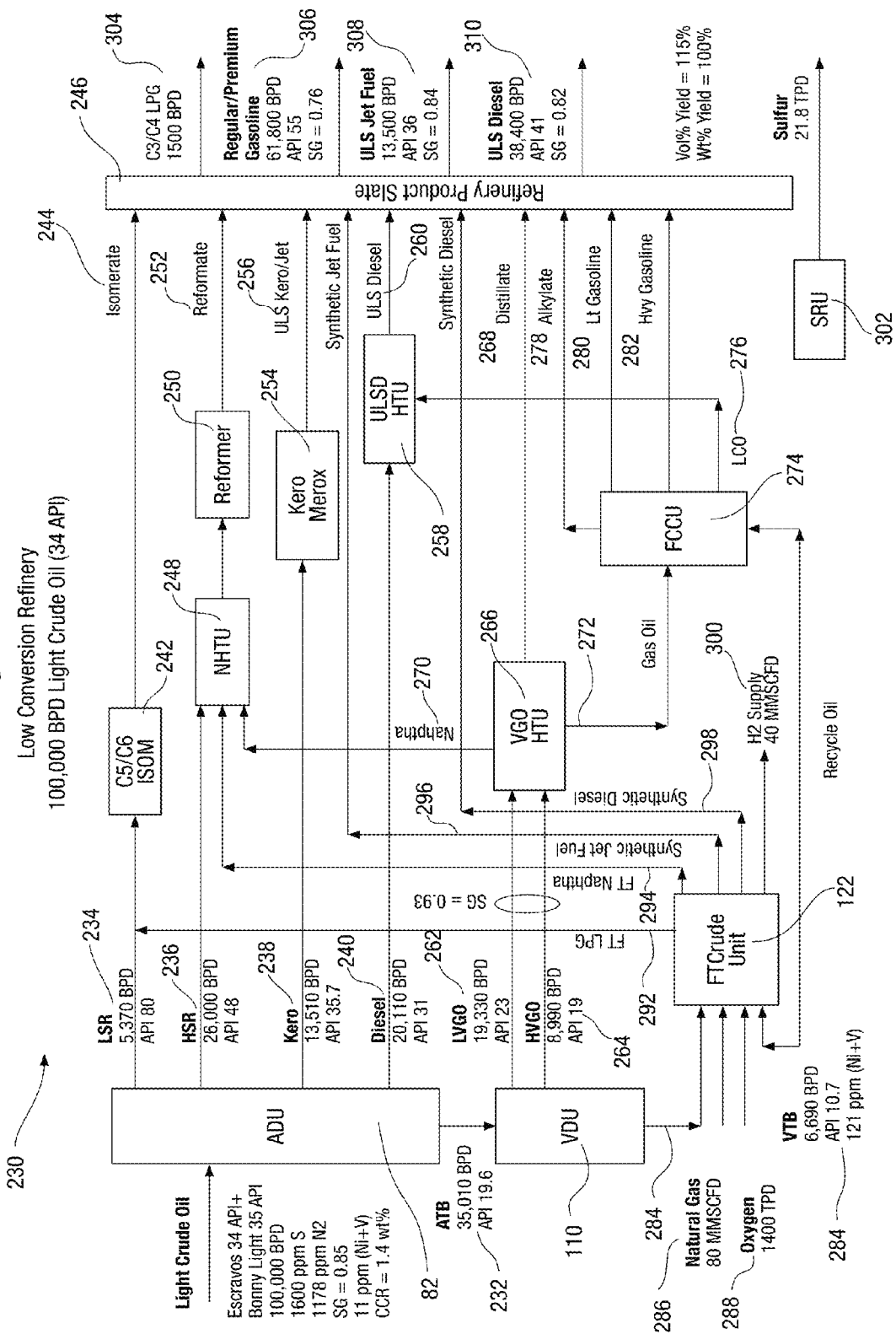
FIG. 8 is a process flow diagram illustrating one embodiment for a low conversion refinery.

Referring now to FIG. 8, shown schematically is an example of a conventional simple low conversion refinery 230 that would receive 30+API (light crude) crude oil, examples of which include Escravos 34 API and/or Bonny light 35 API at a volume of 100,000 BPD having 1600 ppm sulphur and 1178 ppm N2 with a specific gravity of 0.85, CCR of 1.4% by weight and 11 ppm nickel and vanadium content. This type of refinery targets the production of high value ultra lowsulfur (ULSG) gasoline and (ULSD) diesel and produces about 7 vol % of the crude feed as refinery bottoms, denoted as 284. Such refineries are currently experiencing challenges in maintaining a market for products from low value refinery bottoms and typically convert the bottoms to road asphalt and/or fuel oil. Such refineries are facing continuing economic challenges in accessing low density crude (30+API) at competitive costs. To maintain commercial viability, these refineries pursue lower value discounted heavy oil (20 to 25 API) feedstocks to blend with conventional light 30+API crude. The addition of the heavier crude oil increases the production of undesirable refinery bottoms.

The light crude oil is treated in atmospheric distillation unit 82 with 35,010 BPD of atmospheric tower bottoms at 19.6 API being produced referenced by numeral 232. From the ADU 82, light straight run oil (LSR) 234 in an amount of 5,370 BPD at 80 API are generated along with 26,000 BPD of heavy straight run (HSR) 236 oil at an API of 48. Kerosene 238 is produced in an amount of 13,510 BPD at an API of 35.7 and diesel 240 at 31 API in an amount of 20,110 BPD.

The LSR 234 is then treated in a C5/C6 isomerization unit operation with the isomerate 244 collected for the refinery product slate 246 as gasoline blend stock. The HSR 236 is treated in a naphtha hydrotreating unit (NHTU) 248 and then in reformer 250 with the reformate 252 subsequently forming part of the slate 246, also as gasoline blend stock.

The kerosene 238 is treated in a kerosene Merox unit 254 to remove sulfur with the ultra low sulfur kerosene/jet fuel 256 then forming part of the product slate 246.

Diesel 240 is generated in an amount of 20,110 BPD with an API of 33. The diesel 240 is treated in a hydrotreating unit 258 to form (ULSD) ultra low sulfur diesel 260, then forming part of the product slate 246.

Returning to the atmospheric tower bottoms 232, the material is treated in the vacuum distillation unit 110 to yield 19,330 BPD of 23 API light vacuum gas oil 262 and 8,990 BPD of 19 API heavy vacuum gas oil 264. Each of these products is then treated in hydrotreating unit 266 to yield distillate 268 forming part of the product slate 246 with a portion of the naphtha formed from treatment in unit 266 passed into NHTU 248. A further portion, namely gas oil 272 is treated in a (FCC) fluid catalytic cracking unit 274 for production of gasoline blends.

Unconverted light cycle oil (LCO) 276 exiting the FCC unit 274 is further blended and treated in unit 258 to synthesize further ultra low sulfur diesel 260 for slate 246. Alkylates 278, light gasoline 280 and heavy gasoline 282 are then passed into gasoline pool of the product slate 246.

A portion 284 of the vacuum bottoms from unit 110 at 6,690 BPD and API density of 10.7 and containing 121 ppm (nickel and vanadium), together with 80 million standard cubic feet per day (MMSCFD) of natural gas 286 and oxygen 288 in an amount of 1400 tons per day (TPD) is treated in the Fischer-Tropsch unit, described as FTCrude unit to formulate synthetic hydrocarbon byproducts.

Such processing has been discussed herein previously. The resulting product streams of liquid petroleum gas (LPG) 292, FT naphtha 294, synthetic jet fuel 296 and synthetic diesel 298 are passed into the isomerisation unit 242, unit 248 and product slate 246, respectively. Slate 246 accepts both steams 296 and 298, while stream 294 is optionally blended into feed to unit 248, then reformer 250 prior to passage to gasoline pool in product slate 246.

A supply of hydrogen in an amount of 40 MMSCFD also is produced from unit 122 for use in the hydroprocessing units.

A sulfur recovery unit 302 recovers 21.8 TPD of sulfur.

Subsequent to all of the operations, the slate 246 results in 1,500 BPD of C3/C4 liquid petroleum gas (LPG) 304, 61,800 BPD of regular/premium gasoline (ULSG) 306 having an API of 55 and specific gravity of 0.76, 13,500 BPD of jet fuel 308 having an API of 36 and a specific gravity of 0.84, 38,400 BPD of ultra lowsulfur diesel (ULSD) 310 having an API of 41 and a specific gravity of 0.82. The volume % yield is 115% and the weight % yield is 100%.

Beneficially, the process results in:
a) significant high product yield supporting much improved refinery economics;
b) full utilization of the heavy crude resources;
c) lower refinery capital and operating costs;
d) reduced environmental impact, lower GHG, eliminates heavy metals, sulfur, petcoke, heavy sour fuel oils, etc.;
e) a refinery configuration which can handle heavier crude assay; and
f) synthetic diesel quality of greater than 55 cetane, meeting most efficient diesel specification for high performance and high efficiency diesel engines.

In summary, the addition of a FTCrude unit receives the additional vacuum residue without the need to form undesirable fuel oil, petcoke or road asphalt and converts it to high value synthetic fuels such as synthetic diesel and synthetic jet fuel. Significant benefits are realized in that greater than 110 vol % product yield or more specifically greater than 115 vol % product yield can be achieved, without the production of unmarketable byproducts and with a 40 to 80% GHG reduction.

Figure 9:
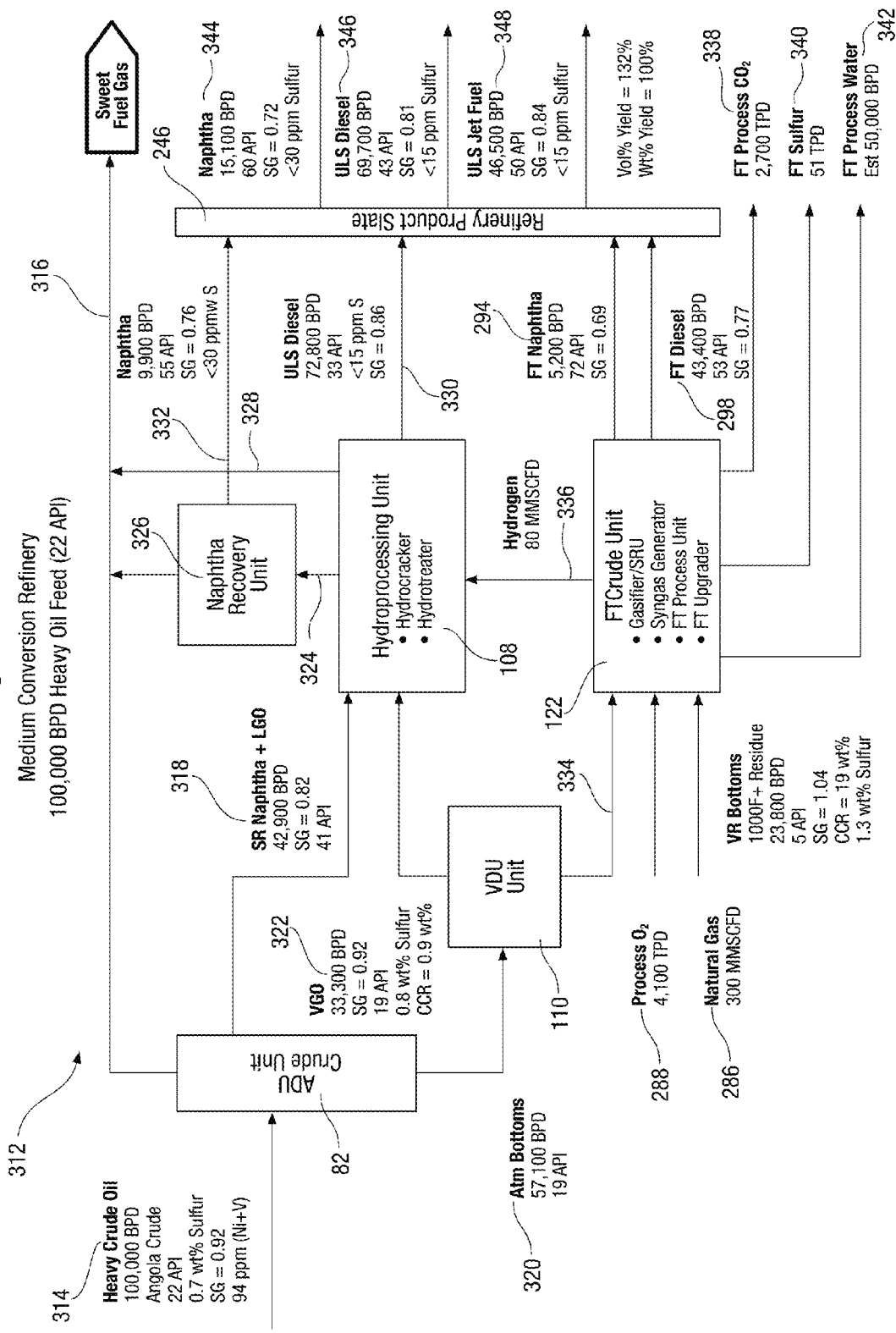
FIG. 9 is a process flow diagram illustrating a medium conversion refinery.

Turning to FIG. 9 illustrates an example of a typical medium conversion refinery that receives the entire crude feed as heavy oil (18 to 22 API) crude oil and targets production to ULSD diesel/jet fuel with the option for naphtha sales or further conversion to ULSD gasoline. FIG. 9 also illustrates the addition of a FTCrude or hydrocarbon synthesis unit to receive additional vacuum residue (approximately 24 vol % of the crude slate) and convert it to high value synthetic fuels such as synthetic diesel and synthetic jet fuel. Significant benefits are realized in that greater than 120 vol % product yield result or more specifically, 130 vol % product yield results, without the production of undesirable byproducts and with a 40 to 80% GHG reduction.

In greater detail of FIG. 9, the overall process is denoted by numeral 312. The refinery process uses a heavy crude oil as an initial feedstock, the heavy crude oil being denoted by numeral 314 in a volume of 100,000 BPD. In this example, the crude is Angola crude having an API of 22 with 0.7 weight percent sulfur with a specific gravity of 0.92 and a metal content of 94 parts per million (ppm) of nickel and vanadium. The heavy crude oil 314 is introduced into ADU unit 82 for processing. The processing steps are well known to those skilled in the art and will not be discussed herein. Subsequent to processing in the ADU unit 82, the result is a stream of sweet fuel gas 316, as well as a stream of straight run naphtha and light gas oil in a combined volume of 42,900 BPD with a specific gravity of 0.82 and an API of 41. The straight run naphtha and light gas oil is denoted by numeral 318. A further stream of product is atmospheric bottoms in a volume of 57,100 BPD having an API of 19. This is denoted by numeral 320. The atmospheric bottoms 320 are introduced into a vacuum distillation unit 110 with the result being vacuum gas oil 322 in a volume of 33,300 barrels per day (BPD) having a specific gravity of 0.92 and an API of 19 with 0.8 weight percent of sulfur and a CCR equivalent to 0.9 weight percent. Both the straight run naphtha and light gas oil 318 and the vacuum gas oil 322 are subsequently introduced separately or combined into the hydro-processing unit 108. In the example, the hydro-processing unit 108 includes unit operations directed to hydrocracking and hydrotreating. This has been generally discussed herein previously with respect to the other embodiments. Subsequent to treatment in hydro-processing unit 108, the naphtha that is produced, denoted by numeral 324 is introduced into a naphtha recovery unit 326 for stabilization and sulphur removal, where light vapour is subsequently passed into the fuel gas stream 316 for removal of further removal of sulfur (H2S) and use as refinery fuel. Similarly, second sour vapour stream 328 from the hydroprocessor units 108 is passed directed to the fuel gas stream 316. All the LGO and VGO is converted and sweetened to primarily produce stream 330 exiting hydro-processing unit 108 as (ULSD) ultra-low sulfur diesel in a volume of 72,800 BPD at 33 API with less than 15 parts per million of sulfur and a specific gravity of 0.86. This is passed into the refinery product slate 246. Similarly, stream 332 exiting naphtha recovery unit 326 comprises sweet, stabilized naphtha in a volume of 9,900 BPD having an API of 55 and a specific gravity of 0.76 and less than 30 parts per million of sulfur. This is also passed into the refinery product slate 246 or can be further processed by reforming to gasoline (not shown) as shown in FIG. 8 as unit 250.

Returning to the vacuum distillation unit 110, a stream 334 comprising a vacuum resid bottom volume of 23,800 BPD at an API of 5 and a specific gravity of 1.04 with a CCR equivalent to 19 weight percent and a sulfur content of 1.3 weight percent is introduced together with process oxygen 288 in an amount of 4,100 TPD and natural gas 286 in an amount of 300 MMSCFD into the FTCrude unit 122. As has been delineated previously in the specification, the FTCrude unit involves XTL operations which include, but are not limited to gasification, syngas generation, the Fischer-Tropsch process unit and the Fischer-Tropsch upgrader. The FTCrude further provides through unit 122 a hydrogen stream 336 in the amount of 80 MMSCFD for use in the hydro-processing unit 108. Product streams exiting the processing unit 122 include the FT LPG (not shown), FT naphtha 294 in an amount of 5,200 BPD having an API of 72 and a specific gravity of 0.69, FT diesel 298 in an amount of 43,400 BPD having an API of 53 and a specific gravity of 0.77, as well as FT process carbon dioxide in an amount of 2,700 tones per day as denoted by numeral 338, FT sulfur in an amount of 51 TPD and FT process water in an estimated amount of 50,000 BPD.

As is illustrated in the flow diagram, the FT diesel 298 and FT naphtha 294 are passed to the product slate 246. FT LPG is generally integrated into the refinery fuel supply.

The result of the refinery products stated in accordance with this embodiment of the present invention includes naphtha 344 in an amount of 15,100 BPD and an API of 60 and a specific gravity of 0.72 with less than 30 parts per million of sulfur, ultra-low sulfur (ULSD) diesel 346 in an amount of 69,700 BPD with an API of 43 and a specific gravity 0.81 with less than 15 parts per million of sulfur and optional ultra-low sulfur jet fuel 348 in an amount of 46,500 BPD with an API 50 and a specific gravity of 0.84 with less than 15 parts per million or ppm of sulfur. The volume percent yield for this process is 132% and the weight percent yield is 100%.

Figure 10:
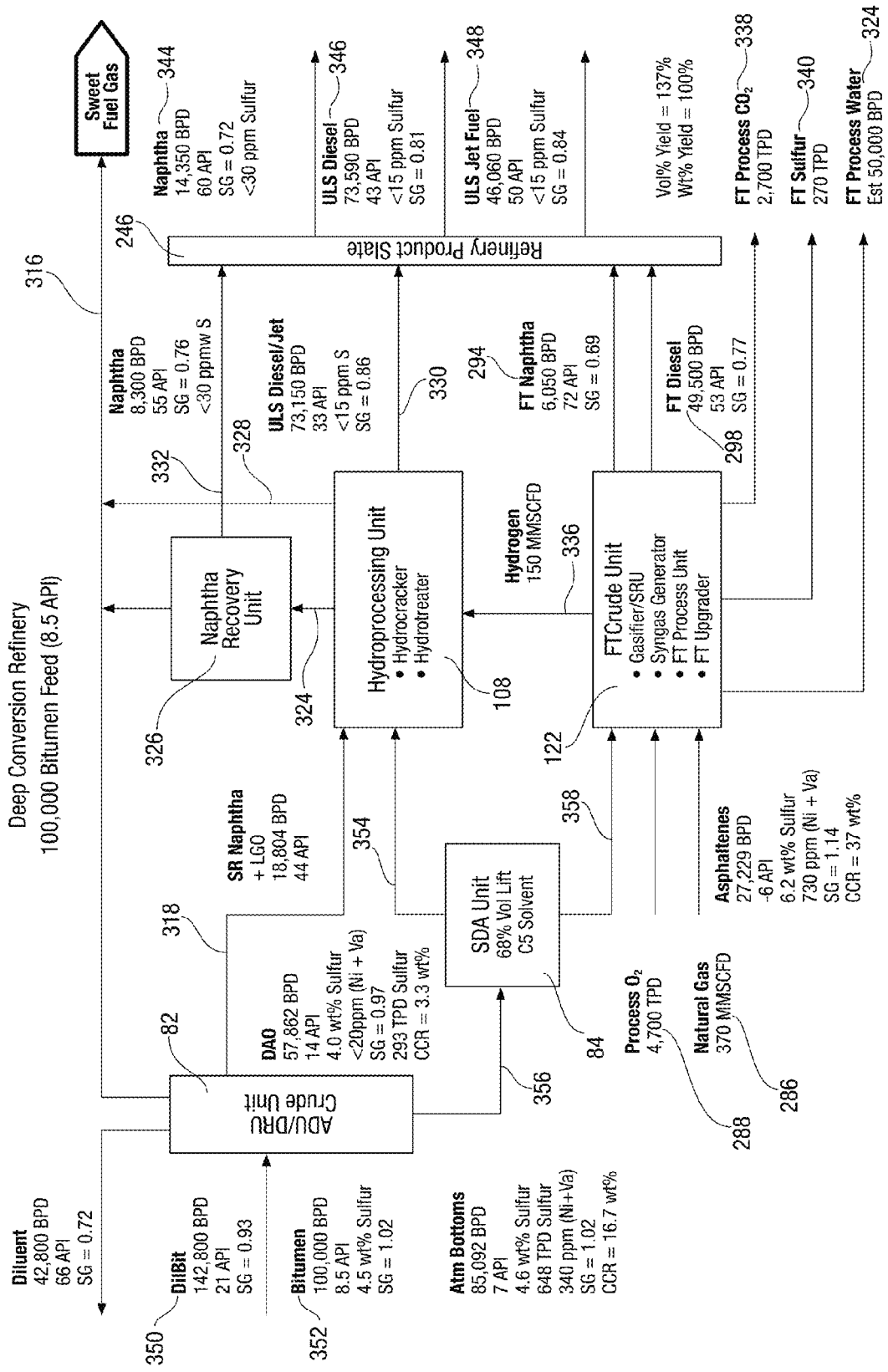
FIG. 10 is a process flow diagram illustrating a deep conversion refinery

FIG. 10 illustrates an example of a deep conversion refinery that receives the entire crude feed as extra heavy oil (12 to 18 API) crude oil and/or bitumen (6 to 11 API) crude oil and primarily targets production of ULSD diesel and naphtha, with the option to further convert to ULSD gasoline. Extra heavy crude oil and bitumen are typically received at the upgrader as diluted crude referred to as DilBit. The diluent is recovered at the upgrader and returned to the crude provider. FIG. 10 also illustrates the addition of a FTCrude or hydrocarbon synthesis unit to receive the significant additional vacuum residue (approximately 60 vol % of the crude slate) and converts it to high value synthetic fuels such as synthetic diesel and synthetic jet fuel. As shown in FIG. 10, it is preferred to further treat the vacuum residue with a solvent deasphalting unit, (SDA), capable of producing a clean deasphalted oil (DAO) for further hydroprocessing into high value diesel/jet products. A host of benefits are realized in that greater than 120 vol % product yield result or more specifically 137 vol % product yield results, without the production of undesirable byproducts and with a 40 to 80% GHG reduction. Generally, the increased product yield represents about 65+% product yield increase over conventional carbon rejection technologies, such as coking, and a 35+% product yield increase over conventional hydrogen addition technologies such as heavy reside hydrocracking.

In greater detail, in this embodiment the ADU unit 82 may receive an initial feedstock of dilbit 315 in an amount of 142,800 BPD with an API 21 and a specific gravity of 0.93, which contains bitumen 352 in an amount of 100,000 BPD having an API of 8.5 and a sulfur content of 4.5% by weight and a specific gravity of 1.02. Subsequent to treatment in the ADU unit 82, the light vapours is taken off as stream 316 and subsequently treated for use a fuel and stream 318 comprises the combined straight run naphtha and light gas oil in an amount of 18,804 BPD at 44 API. In one embodiment of this invention, atmospheric bottoms is processed directly in a Solvent Deasphalting Unit (SDA) 84, whereby deasphalted oil (DAO) 354 in an amount of 57,862 BPD at an API of 14 with a sulfur content of 4% by weight and a metals content of less than 20 ppm (nickel and vanadium) having a specific gravity of 0.97 and CCR equivalent of 3.3% by weight is produced as idea feed to a conventional hydrocracker unit. Streams 318 and 354 are optionally passed into the hydro-processing unit 108 with the produced naphtha 324 being stabilized and treated in naphtha recovery unit 326 and the vapours subsequently passed into sweet fuel gas 316. In this embodiment, the naphtha stream 332 coming from naphtha recovery unit 326 is in the amount of 8,300 BPD at an API of 55 having a specific gravity of 0.76 with less than 30 ppm of sulfur which can optionally be further processed in a Reformer to be produced into gasoline, as previously discussed. The ultra-low sulfur (ULSD) diesel/jet fuel in a volume of 73,150 BPD having an API of 33 with a sulfur content of less than 15 parts per million (ppm) and a specific gravity of 0.86 is primarily produced from the hydroprocessing unit 108. Both streams 332 and 330 are passed into a refinery product slate 246.

In this embodiment, the arrangement includes a deasphalting unit 84 into which a stream 356 from unit 82 is introduced. The stream 356 comprises atmospheric bottoms in a volume of 85,092 BPD having an API of 7 with a 4.6 weight percent content of sulfur and a metals content of 340 ppm (nickel and vanadium) with a specific gravity of 1.02 and a CCR equivalent of 16.7 weight percent. In another embodiment of the present invention, the atmospheric bottoms can optionally be feed a vacuum distillation unit (VDU) and the subsequent vacuum bottoms can feed the SDA unit. From the SDA unit 84, the stream 358 therefrom together with process oxygen 288 in an amount of 4,700 TPD and natural gas 286 in an amount of 370 MMSCFD is introduced into FTC crude unit 122. Stream 358 comprises liquid asphaltene stream in an amount of 27,229 BPD having an API of -6 with a sulfur content of 6.2 percent per weight and a metals content of 730 ppm (nickel and vanadium) with a specific gravity of 1.4 and a CCR equivalent of 37 percent by weight. Subsequent to the treatment in unit 122, the result is the production of, similar to the embodiment in FIG. 9, the FT LPG (not shown), FT naphtha with a volume of 6,050 BPD at an API of 72 and a specific gravity of 0.69 as well as FT diesel 298 in an amount of 49,500 BPD having an API of 53 and a specific gravity of 0.77. To reiterate, streams 298, 294, 330 and 332 form the refinery product slate 246 and are blended or sold separately as high value refined products. The result of this is a naphtha content of 14,350 BPD with a 60 API and a specific gravity of 0.72 together with a sulfur content of less of 30 ppm, this being denoted by 344, which may be optionally further reformed to produce gasoline or marketed as petrochemical feedstock. The slate also includes ultra-low sulfur (USLD) diesel 346 and a volume of 73,590 BPD with an API of 43 and a sulfur content of less than 15 ppm with a specific gravity of 0.81. The slate can further optionally include ultra-low sulfur jet fuel 348 in a volume of 49,060 BDP having an API of 50 and a sulfur content of less than 15 ppm with a specific gravity of 0.84. The volumes of diesel and jet fuel can be further optimized as is well known by those skilled in the art. In this process, the results of streams 338, 340 and 324 are 2,700 TPD, 270 TPD and an estimate of 50,000 BPD, respectively.

It will be appreciated by those skilled in the art that the processes described herein provide a variety of possibilities for refining, partial upgrading or full upgrading, owing to the fact that the unit operations can be reconfigured to achieve the desired result. As an example, the bottoms fraction that is sent to the syngas generating circuit described herein previously can be used for formulating a hydrogen lean gas stream via a partial oxidation reaction. The reaction may be catalytic or non-catalytic. This reaction product can be then treated in a Fischer-Tropsch reactor to synthesize hydrocarbon byproducts while at least a portion of synthetic hydrocarbon byproducts can be removed for commercial market distribution.

While the preferred embodiments of the invention have been shown and described, modifications thereof can be made by one skilled in the art without departing from the spirit and teachings of the invention. Reactor design criteria, hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Background of the Invention is not an admission that it is prior art to the present invention, especially any reference that may have a publication date after the priority date of this application. The disclosures of all patents, patent applications and publications cited herein to the extent that they provide exemplary, procedural or other details supplementary to those set forth herein.

I claim:

1. A process for upgrading crude oil or heavy oil or bitumen to formulate refined hydrocarbon products, wherein said process comprises:
    (a) providing a feedstock source of crude oil, heavy oil or bitumen;
    (b) treating said feedstock to form at least one distilled fraction and a non-distilled bottom fraction;
    (c) optionally treating said non-distilled bottom fraction to a hydrocarbon treatment operation to form a treated fraction and a treated bottom fraction;
    (d) processing said at least one distilled fraction and/or said treated fraction in a hydrocarbon cracking operation to form a processed stream;
    (e) feeding said non-distilled bottom fraction or said treated bottom fraction to a syngas generating operation for formulating a hydrogen lean syngas stream via a partial oxidation reaction and reacting said syngas in a Fischer-Tropsch reactor to formulate synthesized hydrocarbons;
    (f) adding an external source of hydrogen to said hydrogen lean syngas to formulate said synthesized hydrocarbons; and
    (g) blending a portion of said synthesized hydrocarbons with a portion of said processed stream to form said fully refined hydrocarbon products comprising naphtha, gasoline, diesel, kerosene, jet fuel or any combination thereof.

2. The process according to claim 1, wherein said hydrocarbon cracking operation comprises hydrocracking, fluid catalytic cracking, visbreaking or a combination thereof.

3. The process according to claim 2, wherein said hydrocarbon cracking operation further comprises isomerization, fractionation or a combination thereof.

4. The process according to claim 2, wherein said hydrocarbon cracking operation further comprises hydrotreating.

5. The process according to claim 1, wherein said refined hydrocarbon products at least meet physical and chemical properties required for commercial application.

6. The process according to claim 1, wherein said hydrocarbon treatment operation includes desulfurization, demetallization, Conradson Carbon reduction, or combinations thereof.

7. The process according to claim 6, wherein said hydrocarbon treatment operation includes solvent deasphalting, hydrocracking, or combinations thereof.

8. The process according to claim 1, wherein said non-distilled bottom fraction and said treated bottom fraction contain a major amount of concentrated heavy metals, sulfur, naphthenic acid (TAN) and/or Conradson Carbon (CCR).

9. The process according to claim 1, wherein said at least one distilled fraction and said treated fraction contain a minor amount of concentrated heavy metals, sulphur, naphthenic acid (TAN) and/or Conradson Carbon (CCR).

10. The process according to claim 1, wherein said synthesized hydrocarbons include at least one of Fischer-Tropsch vapours, Fischer-Tropsch naphtha, light Fischer-Tropsch liquid and heavy Fischer-Tropsch liquid.

11. The process according to claim 1, wherein said synthesized hydrocarbons contain at least synthetic diesel, synthetic jet fuel, synthetic naphtha, synthetic LPG, synthetic lubes, synthetic wax or combinations thereof.

12. The process according to claim 11, wherein a portion of said at least one distilled fraction, said treated fraction, said synthetic naphtha or combinations thereof is further treated and blended to formulate petrochemical feedstock.

13. The process according to claim 11, wherein a portion of said at least one distilled fraction, said treated fraction, said synthetic naphtha or combinations thereof is further treated and blended to formulate commercial grade gasoline.

14. The process according to claim 11, wherein a portion of said at least one distilled fraction, said treated fraction, said synthetic diesel or combinations thereof is further treated and blended to formulate commercial grade diesel.

15. The process according to claim 11, wherein a portion of said at least one distilled fraction, said treated fraction, said synthetic jet fuel or combinations thereof is further treated and blended to formulate commercial grade jet fuel.

16. The process according to claim 1, wherein said upgrading is achieved absent of coke formation, unconverted residuum and waste byproducts.

17. The process according to claim 1, wherein said upgrading is achieved with greater than 110% volume yield from heavy oil and bitumen.

18. The process according to claim 1, wherein said upgrading is achieved with greater than 135% volume yield from heavy oil and bitumen.

19. The process according to claim 1, wherein said external source of hydrogen comprises a hydrogen rich syngas stream produced from a hydrogen rich syngas generator.

20. The process according to claim 19, wherein said hydrogen rich syngas generator is selected from the group consisting of a steam methane reformer (SMR), autothermal reformer (ATR) and combinations thereof.

21. The process according to claim 19, wherein said hydrogen rich syngas generator uses a hydrogen rich feed to generate said hydrogen rich syngas stream.

22. The process according to claim 21, wherein said hydrogen rich feed is selected from the group consisting of natural gas, refinery fuel gas, LPG, FT vapours, FT naphtha, hydroprocessor vapours and combinations thereof.

23. The process according to claim 19, further including purifying at least a portion of said hydrogen rich syngas stream.

24. The process according to claim 23, wherein said purifying at least a portion of said hydrogen rich syngas is performed by pressure swing adsorption, membrane or liquid absorption.

25. The process according to claim 1, wherein said feedstock is bitumen, which is provided as a bitumen froth, hot bitumen or diluted bitumen (dilbit).

26. The process according to claim 1, wherein said non-distilled bottom fraction or said treated bottom fraction is fed to a gasifier within said syngas generating operation.

27. The process according to claim 1, wherein said non-distilled bottom fraction or said treated bottom fraction is converted to a sour hydrogen lean syngas stream.

28. The process according to claim 27, further including the step of treating said sour hydrogen lean syngas stream to a sour syngas treatment operation.

29. The process according to claim 27, further including the step of treating said sour hydrogen lean syngas stream to a series of unit operations prior to reaction in said Fischer-Tropsch unit.

30. The process according to claim 1, wherein the at least one distilled fraction and/or said treated fraction contain at least a portion of straight run distillate (AGO), naphtha, vacuum gas oil (VGO) or deasphalted oil (DAO).

31. The process according to claim 1, wherein at least a portion of the at least one distilled fraction and/or said treated fraction are further hydroprocessed separately or in combination.

32. The process according to claim 31, characterized in that said hydroprocessing includes at least one operation selected from the group consisting of hydrocracking, visbreaking, thermocracking, hydrotreating, isomerization, fractionation and combinations thereof.

33. The process according to claim 1, further including the step of augmenting the process with an auxiliary source of hydrogen.

34. The process according to claim 33, wherein said auxiliary source of hydrogen comprises a hydroprocessing unit gas.

35. The process according to claim 33, wherein said auxiliary source of hydrogen comprises a hydrogen rich gas from a hydrocracker, a thermal cracker, a hydrotreater, a isomerization unit, a fractionator or combinations thereof.

36. The process according to claim 20, wherein said hydrogen rich syngas generator receives as feedstock at least one of natural gas, refinery fuel gas, LPG, Fischer-Tropsch vapours, Fischer Tropsch naphtha, and combinations thereof.

37. The process according to claim 1, wherein said bitumen is an in-situ source.

38. The process according to claim 1, wherein said bitumen is a mineable source.

39. The process according to claim 23, wherein said purifying includes separating hydrogen from said at least a portion of said hydrogen rich syngas to generate hydrogen lean tail gas stream.

40. The process according to claim 39, further comprising combining said hydrogen lean tail gas stream with said hydrogen rich syngas stream and said hydrogen lean syngas stream.

41. The process according to claim 1, wherein a portion of said at least one distilled fraction, said treated fraction, or both is further hydroprocessed before and/or after said hydrocarbon cracking operation.

\* \* \* \* \*